United States Patent
Hwang et al.

(10) Patent No.: US 11,368,910 B2
(45) Date of Patent: Jun. 21, 2022

(54) METHOD AND DEVICE FOR TRANSMITTING/RECEIVING WIRELESS SIGNAL IN WIRELESS COMMUNICATION SYSTEM

(71) Applicant: LG Electronics Inc., Seoul (KR)

(72) Inventors: Seunggye Hwang, Seoul (KR); Jaehyung Kim, Seoul (KR); Changhwan Park, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 26 days.

(21) Appl. No.: 16/964,718

(22) PCT Filed: Jan. 28, 2019

(86) PCT No.: PCT/KR2019/001141
§ 371 (c)(1),
(2) Date: Jul. 24, 2020

(87) PCT Pub. No.: WO2019/147088
PCT Pub. Date: Aug. 1, 2019

(65) Prior Publication Data
US 2020/0359322 A1    Nov. 12, 2020

Related U.S. Application Data

(60) Provisional application No. 62/669,958, filed on May 10, 2018, provisional application No. 62/630,269, (Continued)

(30) Foreign Application Priority Data

May 10, 2018  (KR) .................. 10-2018-0053976

(51) Int. Cl.
*H04W 52/02* (2009.01)
*H04W 76/11* (2018.01)
(Continued)

(52) U.S. Cl.
CPC ..... *H04W 52/0229* (2013.01); *H04J 13/0062* (2013.01); *H04L 27/2607* (2013.01); *H04W 72/0453* (2013.01); *H04W 76/11* (2018.02)

(58) Field of Classification Search
None
See application file for complete search history.

(56) References Cited

U.S. PATENT DOCUMENTS

2014/0126442 A1   5/2014   Jafarian et al.
2014/0185501 A1   7/2014   Park et al.
(Continued)

FOREIGN PATENT DOCUMENTS

EP   3796720       3/2021
JP   2020534735    11/2020
(Continued)

OTHER PUBLICATIONS

Huawei, HiSilicon, "On detailed design and evaluations of power saving signal," R1-1719472, 3GPP TSG RAN WG1 Meeting #91, Reno, USA, dated Nov. 27-Dec. 1, 2017, 31 pages.
(Continued)

*Primary Examiner* — Hong Shao
(74) *Attorney, Agent, or Firm* — Fish & Richardson P.C.

(57) ABSTRACT

The present invention relates to a wireless communication system and, particularly, to a method and a device therefor, the method comprising the steps of: receiving a WUS sequence in a WUS resource on a carrier, wherein the WUS resource is defined as a plurality of consecutive OFDM symbols and a plurality of consecutive subcarriers; and attempting to detect a physical channel corresponding to the WUS, wherein the WUS sequence exists in the same pattern regardless of the position of a frequency band of the carrier, in the $N^{th}$ (N>1) to last OFDM symbols of the WUS resource, and the WUS sequence exists selectively on the basis of the position of the frequency band of the carrier, in the first to $(N-1)^{th}$ OFDM symbols of the WUS resource.

13 Claims, 16 Drawing Sheets

Related U.S. Application Data filed on Feb. 14, 2018, provisional application No. 62/622,153, filed on Jan. 26, 2018.

(51) Int. Cl.
*H04J 13/00* (2011.01)
*H04L 27/26* (2006.01)
*H04W 72/04* (2009.01)

(56) References Cited

U.S. PATENT DOCUMENTS

| | | | |
|---|---|---|---|
| 2017/0111858 A1 | 4/2017 | Azizi et al. | |
| 2019/0090192 A1* | 3/2019 | Liu | H04W 52/028 |
| 2020/0029302 A1* | 1/2020 | Cox | H04W 56/0015 |

FOREIGN PATENT DOCUMENTS

| | | |
|---|---|---|
| JP | 2020534736 | 11/2020 |
| KR | 1020170142209 | 12/2017 |
| WO | WO2019055419 | 3/2019 |
| WO | WO2019055421 | 3/2019 |

OTHER PUBLICATIONS

LG Electronics, "Discussion on wake up signal configurations and procedures," R1-1719878, 3GPP TSG RAN WG1 Meeting 91, Reno, USA, dated Nov. 27-Dec. 1, 2017, 5 pages.
LG Electronics, "Wake up signal design in NB-IoT," R1-1719879, 3GPP TSG RAN WG1 Meeting 91, Reno, USA, dated Nov. 27-Dec. 1, 2017, 7 pages.
PCT International Search Report and Written Opinion in International Application No. PCT/KR2019/001141, dated May 15, 2019, 17 pages (with English translation).
Sony, "WUS evaluations for efeMTC," R1-1720467, 3GPP TSG RAN WG1 Meeting #91, Reno, USA, dated Nov. 27-Dec. 1, 2017, 8 pages.
Huawei, HiSilicon, "Consideration and evaluation on power saving signal in NB-IoT," R1-1712113, 3GPP TSG RAN WG1 Meeting #90, Prague, Czech Republic, dated Aug. 21-25, 2017, 15 pages.
Qualcomm Incorporated, "Comparison of WUS sequence design," R1-1720424, 3GPP TSG RAN WG1 Meeting #91, Reno, USA, dated Nov. 27-Dec. 1, 2017, 10 pages.
Ericsson, "Downlink channel power efficiency for MTC," R1-1804122, Presented at 3GPP TSG-RAN WG1 Meeting #92bis, Sanya, P.R. China, Apr. 16-20, 2018, 8 pages.
Extended European Search Report in European Appln. No. 19744547.1, dated Sep. 6, 2021, 11 pages.
Huawei & HiSilicon, "On detailed design and evaluations of power saving signal," R1-1716986, Presented at 3GPP TSG RAN WG1 Meeting #90bis, Prague, Czech Republic, Oct. 9-13, 2017, 12 pages.
Huawei & HiSilicon, "On detailed design and evaluations of power saving signal," R1-1803868, Presented at 3GPP TSG RAN WG1 Meeting #92bis, Sanya, China, Apr. 16-20, 2018, 19 pages.
Office Action in Japanese Appln. No. 2020-540620, dated Oct. 19, 2021, 7 pages (with English translation).
Qualcomm Incorporated, "Detailed design for Wake-up signal sequence," R1-1807109, Presented at 3GPP TSG RAN WG1 Meeting #93, Busan, Korea, May 21-25, 2018, 12 pages.

\* cited by examiner

METHOD AND DEVICE FOR TRANSMITTING/RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2019/001141, filed on Jan. 28, 2019, which claims the benefit of Korean Application No. 10-2018-0053976, filed on May 10, 2018, U.S. Provisional Application No. 62/669,958, filed on May 10, 2018, U.S. Provisional Application No. 62/630,269, filed on Feb. 14, 2018, and U.S. Provisional Application No. 62/622,153, filed on Jan. 26, 2018. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present disclosure is to provide a method and apparatus for efficiently performing a wireless signal transmission/reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving a signal by a communication device in a wireless communication system includes receiving a wake-up signal (WUS) sequence in WUS resource on a carrier, wherein the WUS resource is defined by a plurality of consecutive orthogonal frequency division multiplexing (OFDM) symbols and a plurality of consecutive subcarriers, and attempting to detect a physical channel corresponding to the WUS. The WUS sequence exists in a same pattern in $N^{th}$ (N>1) to last OFDM symbols of the WUS resources irrespective of a position of a frequency band of the carrier. The WUS sequence exists selectively in $1^{st}$ to $(N-1)^{th}$ OFDM symbols of the WUS resources based on the position of the frequency band of the carrier.

In another aspect of the present disclosure, a communication device used in a wireless communication system includes a memory and a processor. The processor is configured to receive a WUS sequence in WUS resource on a carrier, wherein the WUS resource is defined by a plurality of consecutive OFDM symbols and a plurality of consecutive subcarriers, and attempt to detect a physical channel corresponding to the WUS. The WUS sequence exists in a same pattern in $N^{th}$ (N>1) to last OFDM symbols of the WUS resources irrespective of a position of a frequency band of the carrier. The WUS sequence exists selectively in $1^{st}$ to $(N-1)^{th}$ OFDM symbols of the WUS resources based on the position of the frequency band of the carrier.

The WUS resource may be defined by 14 consecutive OFDM symbols and 12 consecutive subcarriers, and N may be 4.

The WUS sequence may include a length-131 Zadoff-Chu (ZC) sequence.

When a narrowband-Internet of things (NB-IoT) mode of the user equipment (UE) is an in-band mode, the frequency band of the carrier may be located within a $3^{rd}$ generation partnership project (3GPP) long term evolution (LTE) system band. Wherein when the NB-IoT mode of the UE is a guard-band mode or a stand-alone mode, the frequency band of the carrier may be located outside the 3GPP LTE system band.

When the NB-IoT mode of the UE is the in-band mode, no WUS sequence may exist in the first to $(N-1)^{th}$ OFDM symbols of the WUS resources, and wherein when the NB-IoT mode of the UE is the guard-band mode or the stand-alone mode, the same WUS sequence as in (N-1) consecutive OFDM symbols among the $N^{th}$ (N>1) to last OFDM symbols of the WUS resources may exist in the first to $(N-1)^{th}$ OFDM symbols of the WUS resources.

N may be 4, and the (N-1) consecutive OFDM symbols may include fourth, fifth, and sixth OFDM symbols.

The physical channel corresponding to the WUS may include a physical downlink control channel (PDCCH) having a paging radio network temporary identifier (P-RNTI).

The communication device may further include a radio frequency (RF)module.

Advantageous Effects

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink (DL) and SC-FDMA for uplink (UL). LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through DL from a base station (BS) and transmit information to the BS through UL. The information transmitted and received by the BS and the UE includes data and various control information and includes various physical channels according to type/usage of the information transmitted and received by the UE and the BS.

Figure 1:
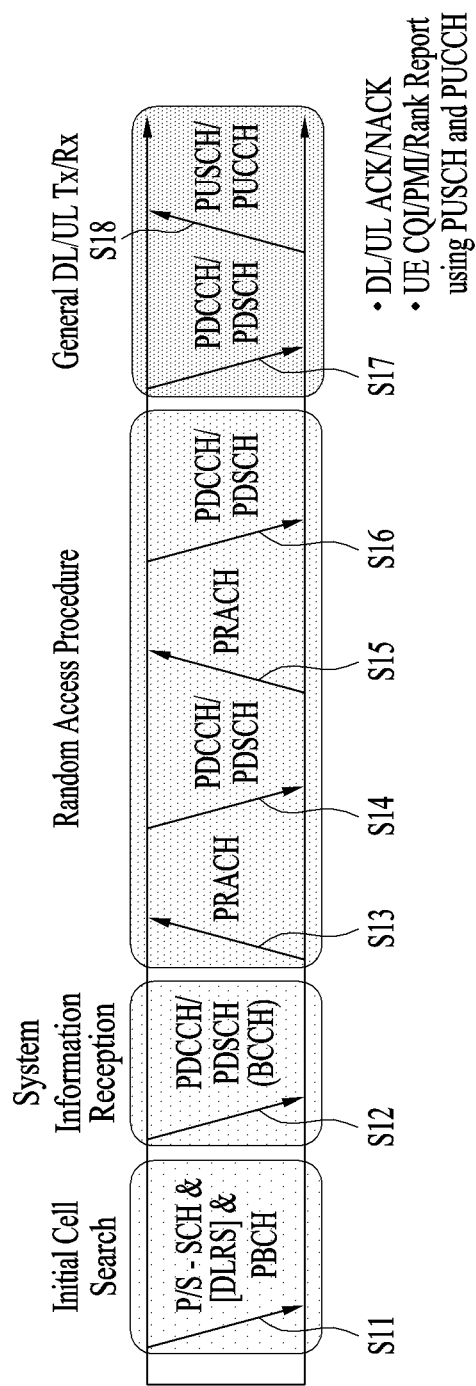
FIG. 1 illustrates physical channels used in 3rd generation partnership project (3GPP) long term evolution(-advanced) (LTE(-A)) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a DL channel status by receiving a DL reference signal (RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general DL/UL signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
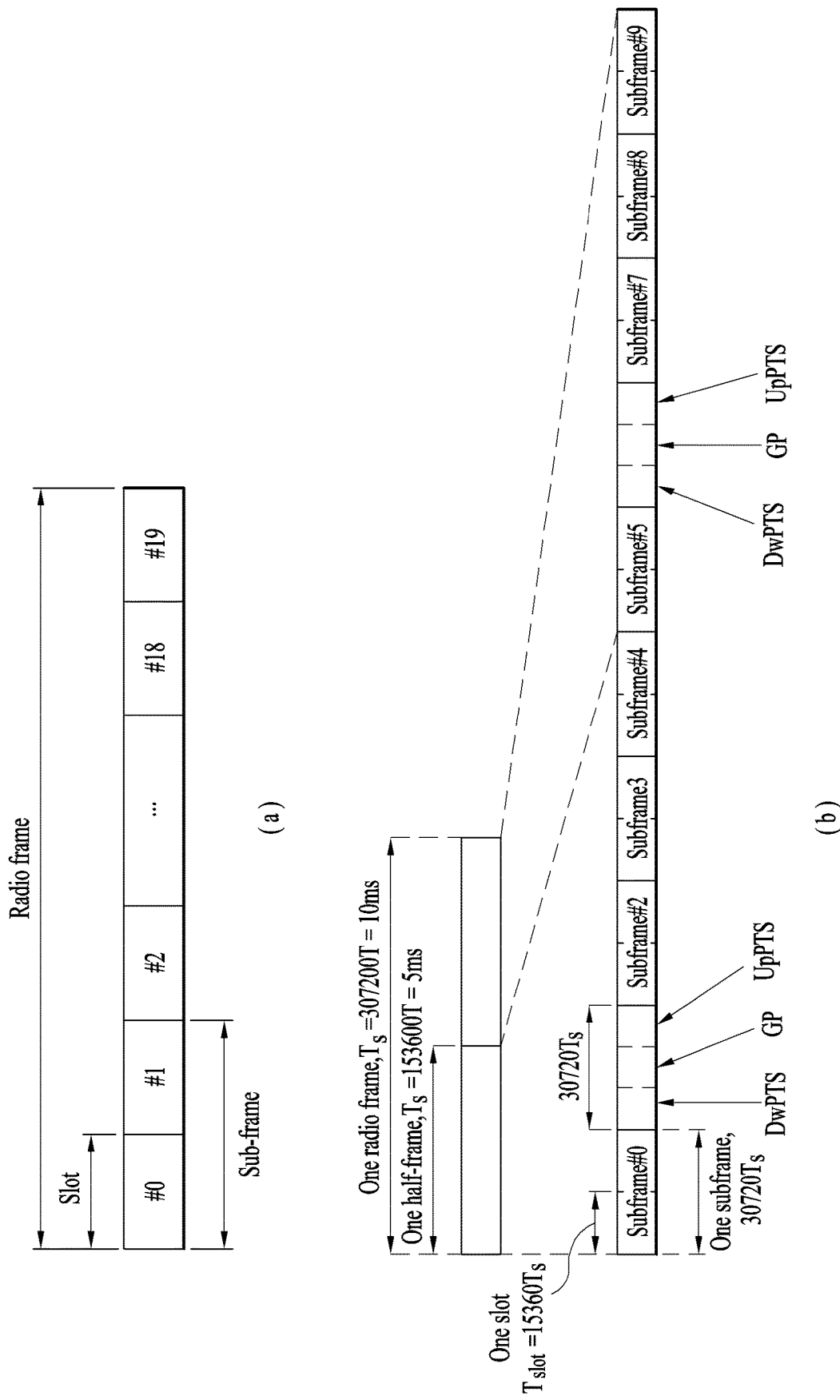
FIG. 2 illustrates a radio frame structure.

FIG. 2 illustrates a radio frame structure. UL/DL data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A DL subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since DL uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for UL or DL according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and UL transmission synchronization in a UE. The GP eliminates UL interference caused by multi-path delay of a DL signal between a UL and a DL. The radio frame structure is merely exemplary and the number of subframes included in the radio frame, the number of slots included in a subframe, and the number of symbols included in a slot can be vary.

Figure 3:
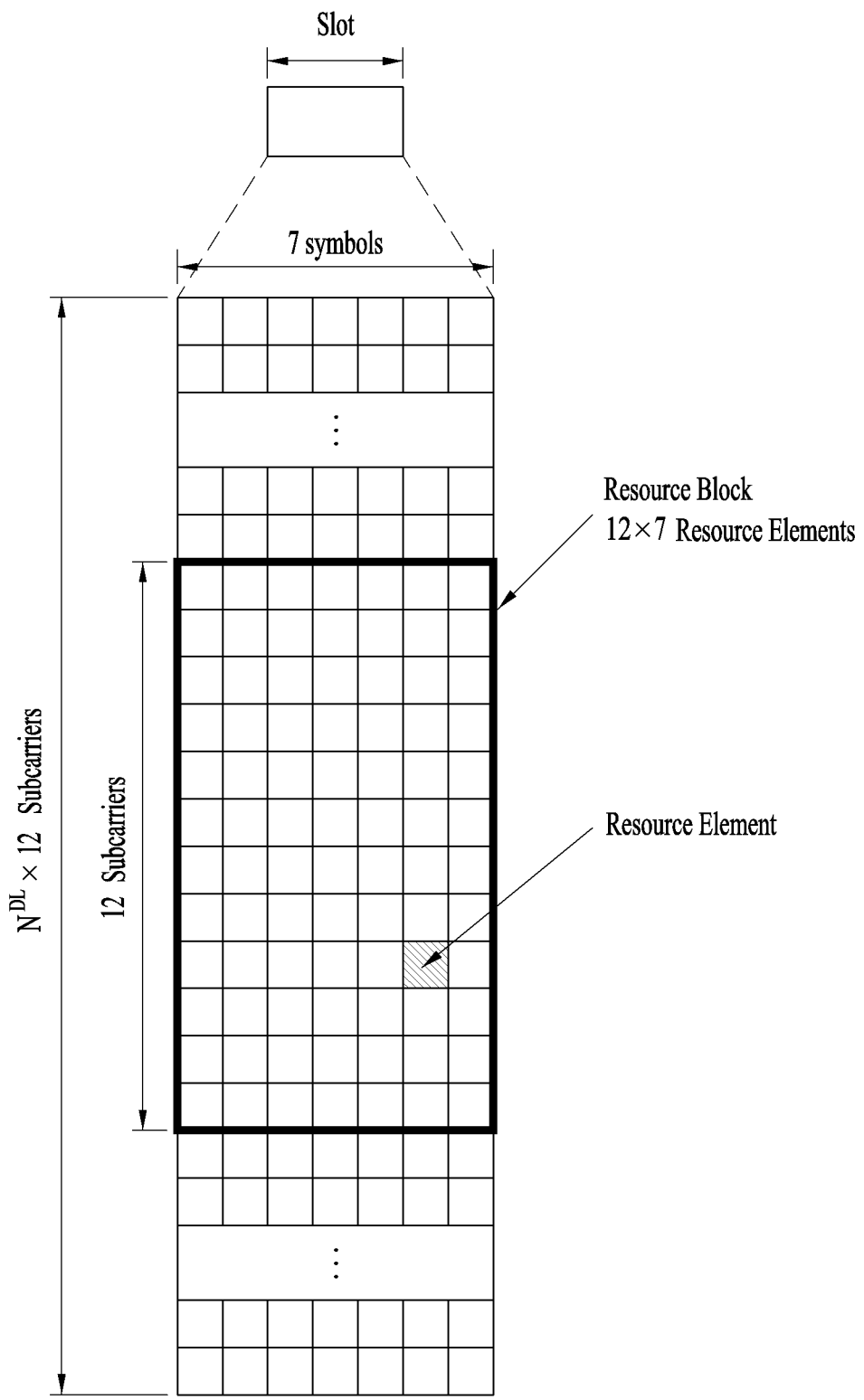
FIG. 3 illustrates a resource grid of a downlink slot.

FIG. 3 illustrates a resource grid of a DL slot.

Referring to FIG. 3, a DL slot includes a plurality of OFDM symbols in the time domain. While one DL slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the DL slot depends on a DL transmit bandwidth. The structure of a UL slot may be same as that of the DL slot.

Figure 4:
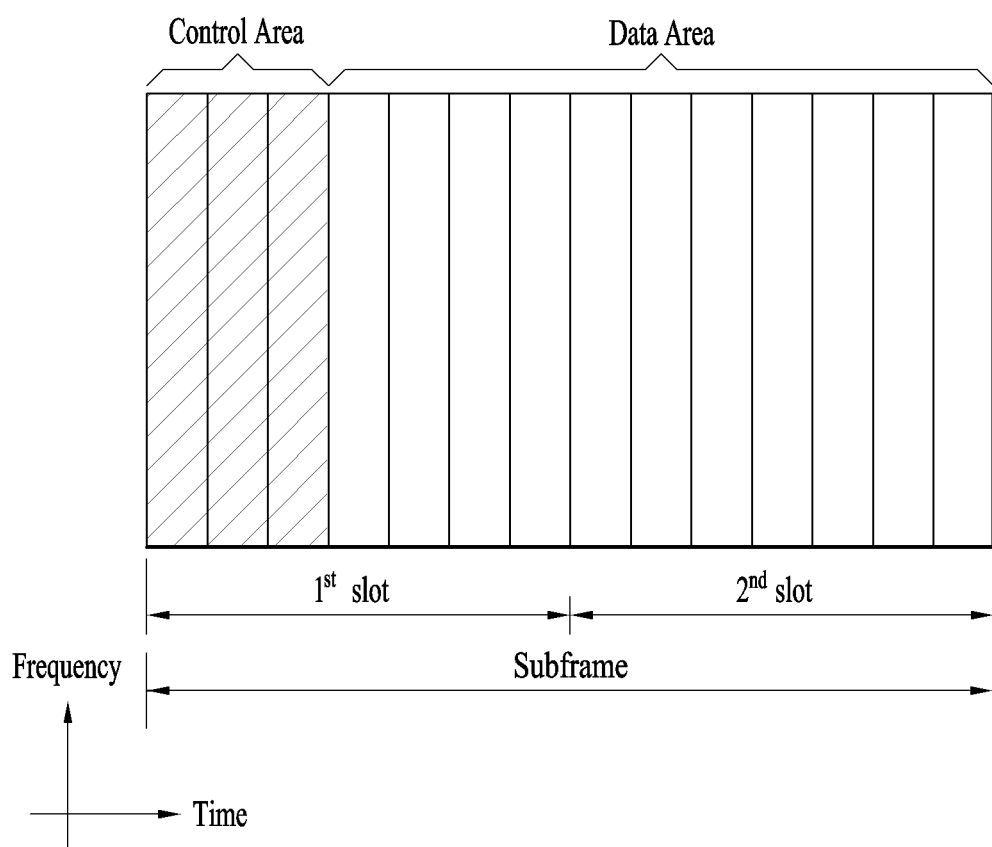
FIG. 4 illustrates a downlink subframe structure.

FIG. 4 illustrates a DL subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical DL shared channel (PDSCH) is allocated. A basic resource unit of the data region is an RB. Examples of DL control channels used in LTE include a physical control format indicator channel (PCFICH), a physical DL control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/negative-acknowledgment (NACK) signal. Control information transmitted through the PDCCH is referred to as DL control information (DCI). The DCI includes UL or DL scheduling information or a UL transmit power control command for an arbitrary UE group.

Control information transmitted through the PDCCH is referred to as DL control information (DCI). Formats 0, 3, 3A and 4 for UL and formats 1, 1A, 1B, 1C, 1D, 2, 2A, 2B and 2C for DL are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a DL shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other DL control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality DL channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission mode (TM)
    Transmission mode 1: Transmission from a single base station antenna port
    Transmission mode 2: Transmit diversity
    Transmission mode 3: Open-loop spatial multiplexing
    Transmission mode 4: Closed-loop spatial multiplexing
    Transmission mode 5: Multi-user MIMO (Multiple Input Multiple Output)
    Transmission mode 6: Closed-loop rank-1 precoding
    Transmission mode 7: Single-antenna port (port5) transmission
    Transmission mode 8: Double layer transmission (ports 7 and 8) or single-antenna port (port 7 or 8) transmission
    Transmission mode 9: Transmission through up to 8 layers (ports 7 to 14) or single-antenna port (port 7 or 8) transmission DCI Format
    Format 0: Resource grants for PUSCH transmission
    Format 1: Resource assignments for single codeword PDSCH transmission (transmission modes 1, 2 and 7)
    Format 1A: Compact signaling of resource assignments for single codeword PDSCH (all modes)
    Format 1B: Compact resource assignments for PDSCH using rank-1 closed loop precoding (mod 6)
    Format 1C: Very compact resource assignments for PDSCH (e.g. paging/broadcast system information)
    Format 1D: Compact resource assignments for PDSCH using multi-user MIMO (mode 5)
    Format 2: Resource assignments for PDSCH for closed-loop MIMO operation (mode 4)
    Format 2A: Resource assignments for PDSCH for open-loop MIMO operation (mode 3)
    Format 3/3A: Power control commands for PUCCH and PUSCH with 2-bit/1-bit power adjustments FIG. 5 is a diagram illustrating a UL subframe structure in LTE(-A).

Figure 5:
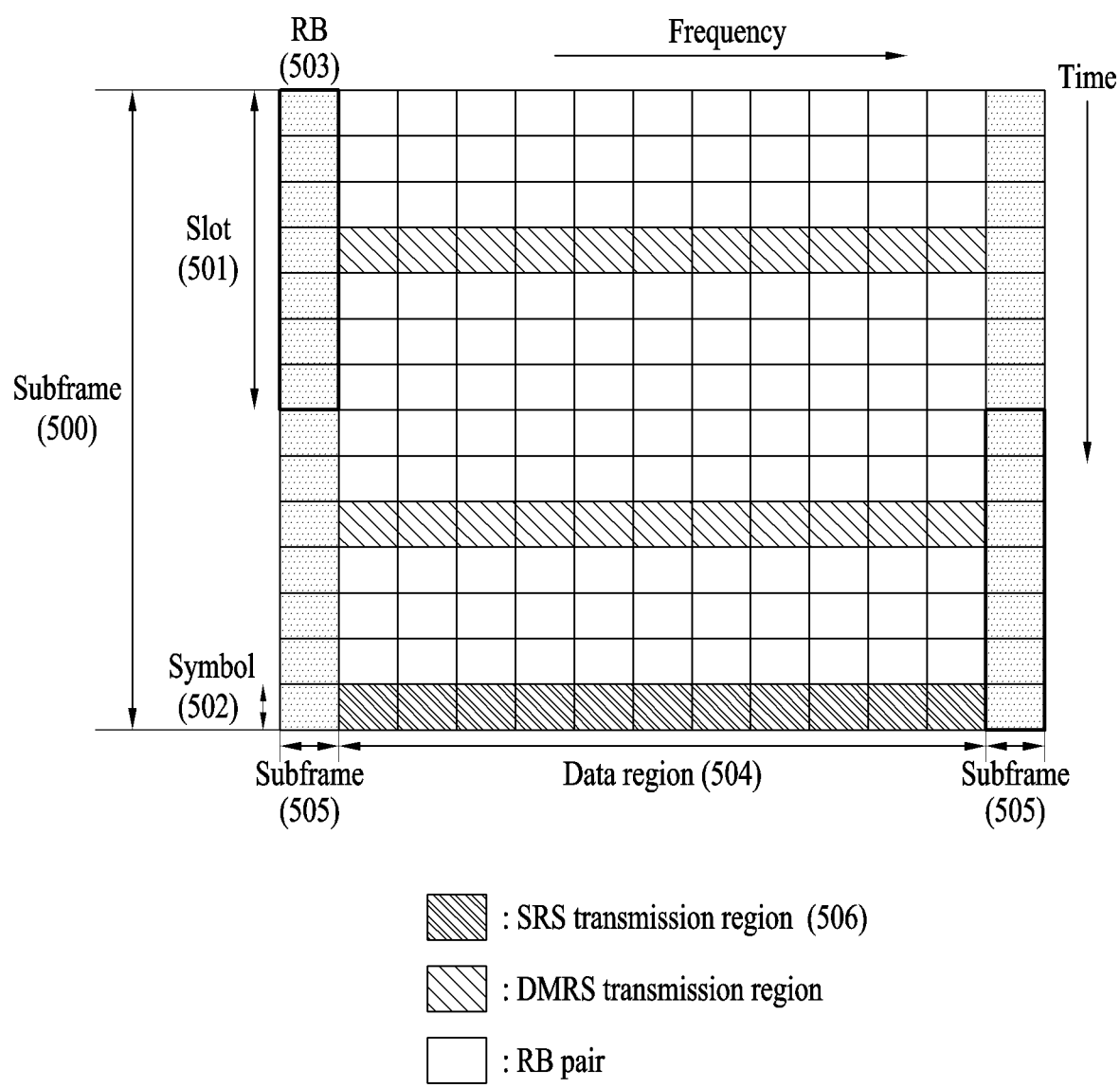
FIG. 5 illustrates the structure of an uplink subframe used in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the UL subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of a UL control signal, for example, DL channel quality report from each UE, reception ACK/NACK for a DL signal, UL scheduling request, etc.

and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit a UL channel state to an eNB and is periodically transmitted according to a subframe period/offset set by a higher layer (e.g., RRC layer) or aperiodically transmitted at the request of the eNB.

Figure 6:
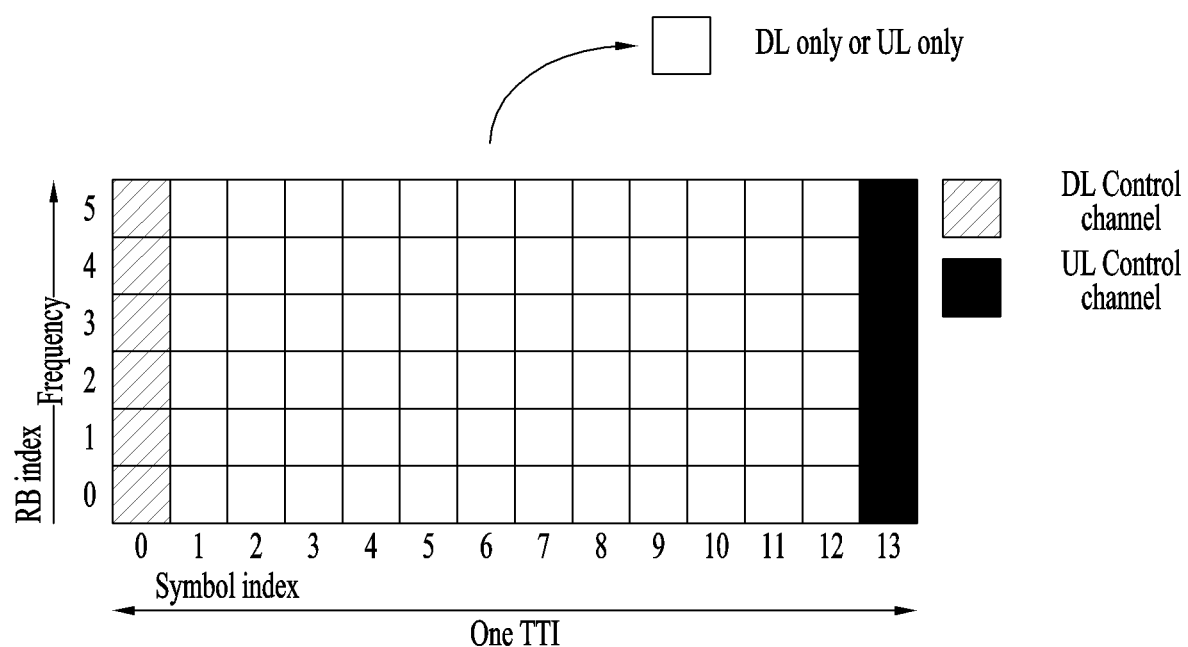
FIG. 6 illustrates an exemplary structure of a self-contained subframe.

To minimize data transmission latency, a self-contained subframe is considered in the next-generation radio access technology (RAT). FIG. 6 illustrates an exemplary self-contained subframe structure. In FIG. 6, the hatched area represents a DL control region, and the black area represents a UL control region. The area having no marks may be used for either DL data transmission or UL data transmission. In this structure, DL transmission and UL transmission are sequentially performed in one subframe to transmit DL data and receive a UL ACK/NACK for the DL data in the subframe. As a result, the resulting reduction of a time taken to retransmit data when a data transmission error occurs may lead to minimization of the latency of a final data transmission.

At least the following four subframe types may be considered as exemplary constructible/configurable self-contained subframe types. Periods are enumerated in time order.

DL control period+DL data period+guard period (GP)+ UL control period

DL control period+DL data period

DL control period+GP+UL data period+UL control period

DL control period+GP+UL data period

A PDFICH, a PHICH, and a PDCCH may be transmitted in the DL control period, and a PDSCH may be transmitted in the DL data period. A PUCCH may be transmitted in the UL control period, and a PUSCH may be transmitted in the UL data period. The GP provides a time gap for switching from a transmission mode to a reception mode or from the reception mode to the transmission mode at an eNB and a UE. Some OFDM symbol(s) at a DL-to-UL switching time may be configured as the GP.

In the environment of the 3GPP NR system, different OFDM numerologies, for example, different subcarrier spacings (SCSs) and hence different OFDM symbol (OS) durations may be configured between a plurality of cells aggregated for one UE. Accordingly, the (absolute time) duration of a time resource (e.g., SF, slot or TTI) (referred to as a time unit (TU) for convenience) including the same number of symbols may be set differently for the aggregated cells. Herein, the term symbol may cover OFDM symbol and SC-FDMA symbol.

Figure 7:
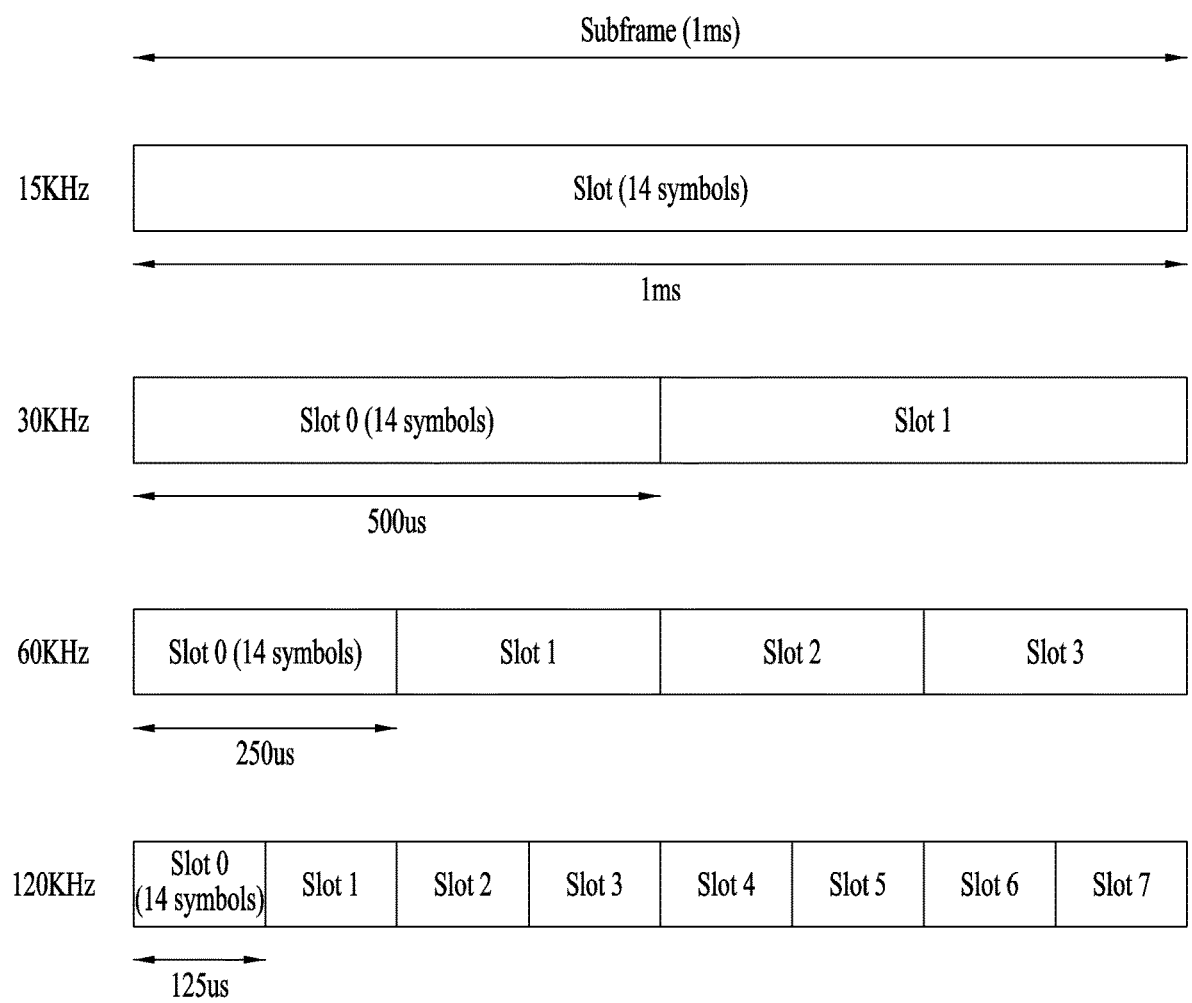
FIG. 7 illustrates frame structures defined in 3GPP NR.

FIG. 7 illustrates frame structures defined in 3GPP NR. In 3GPP NR, one radio frame includes 10 subframes each being 1 ms in duration, like a radio frame in LTE/LTE-A (see FIG. 2). One subframe includes one or more slots and the length of a slot varies with an SCS. 3GPP NR supports SCSs of 15 KHz, 30 KHz, 60 KHz, 120 KHz, and 240 KHz. A slot corresponds to a TTI in FIG. 6.

As noted from Table 4, the number of symbols per slot, the number of slots per frame, and the number of slots per subframe vary according to SCSs.

TABLE 4

| SCS (15 * 2^u) | Number of symbols per slot | Number of slots per frame | Number of slots per subframe |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

A description will be given of narrowband Internet of things (NB-IoT). While NB-IoT is described based on the 3GPP LTE standards for convenience, the following description is also applicable to the 3GPP NR standards. For this purpose, some technical configurations may be replaced with other ones in interpretation (e.g., LTE band→NR band and subframe→slot). NB-IoT supports three operation modes: in-band mode, guard-band mode, and stand-alone mode. The same requirements apply to each mode.

(1) In-band mode: a part of the resources of the LTE band are allocated to NB-IoT.

(2) Guard-band mode: a guard frequency band of the LTE band is used, and an NB-IoT carrier is arranged as close as possible to an edge subcarrier of the LTE band.

(3) Stand-alone mode: some carriers in the GSM band are allocated to NB-IoT.

An NB-IoT UE searches for an anchor carrier in units of 100 kHz, for initial synchronization, and the center frequency of the anchor carrier should be located within 7.5 kHz from a 100-kHz channel raster in the in-band and guard-band. Further, the center 6 physical resource blocks (PRBs) of the LTE PRBs are not allocated to NB-IoT. Therefore, the anchor carrier may be located only in a specific PRB.

Figure 8:
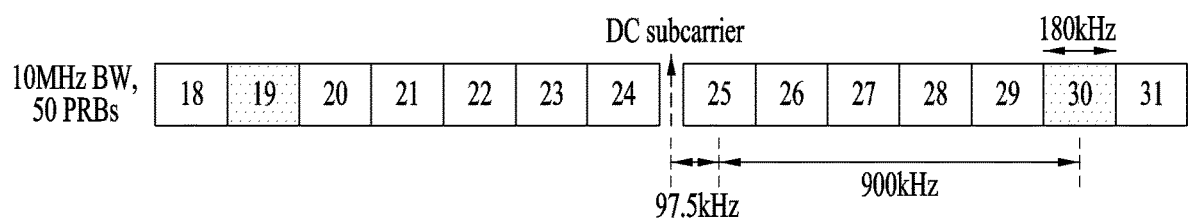
FIG. 8 illustrates arrangement of an in-band anchor carrier in an LTE bandwidth of 10 MHz.

FIG. 8 is a diagram illustrating arrangement of an in-band anchor carrier in an LTE bandwidth of 10 MHz.

Referring to FIG. 8, a direct current (DC) subcarrier is located on a channel raster. Since the center frequency spacing between adjacent PRBs is 180 kHz, the center frequencies of PRBs 4, 9, 14, 19, 30, 35, 40 and 45 are located at 2.5 kHz from the channel raster. Similarly, when the bandwidth is 20 MHz, the center frequency of a PRB suitable as the anchor carrier is located at 2.5 kHz from the channel raster, and when the bandwidth is 3 MHz, 5 MHz, or 15 MHz, the center frequency of a PRB suitable as the anchor carrier is located at 7.5 kHz from the channel raster.

In the guard-band mode, given bandwidths of 10 MHz and 20 MHz, the center frequency of a PRB immediately adjacent to an edge PRB of the LTE system is located at ±2.5 kHz from the channel raster. Further, given bandwidths of 3 MHz, 5 MHz, and 15 MHz, a guard frequency band corresponding to three subcarriers from an edge PRB may be used, and thus the center frequency of the anchor carrier may be located at ±7.5 kHz from the channel raster.

In the stand-alone mode, an anchor carrier is aligned with the 100-kHz channel raster, and all GSM carriers including the DC carrier may be available as the NB-IoT anchor carrier.

Further, NB-IoT may support multiple carriers, and a combination of in-band and in-band, a combination of in-band and guard-band, a combination of guard-band and guard-band, and a combination of stand-alone and stand-alone are available.

NB-IoT DL uses OFDMA with a 15-kHz SCS. OFDMA provides orthogonality between subcarriers, so that the NB-IoT system and the LTE system may coexist smoothly.

For NB-IoT DL, physical channels such as a narrowband physical broadcast channel (NPBCH), a narrowband physical downlink shared channel (NPDSCH), and a narrowband physical downlink control channel (NPDCCH) may be provided, and physical signals such as a narrowband primary synchronization signal (NPSS), a narrowband primary synchronization signal (NSSS), and a narrowband reference signal (NRS) are provided.

The NPBCH delivers minimum system information required for an NB-IoT UE to access the system, a master information block-narrowband (MIB-NB) to the NB-IoT UE. The NPBCH signal may be transmitted repeatedly eight times in total for coverage enhancement. The transport block size (TBS) of the MIB-NB is 34 bits and updated every TTI of 640 ms. The MIB-NB includes information about an operation mode, a system frame number (SFN), a hyper-SFN, the number of cell-specific reference signal (CRS) ports, and a channel raster offset.

The NPSS includes a Zadoff-Chu (ZC) sequence of length 11 and root index 5. The NPSS may be generated by the following equation.

$$d_l(n) = S(l) \cdot e^{-j\frac{\pi u n(n+1)}{11}}, n = 0, 1, \ldots, 10 \quad [\text{Equation 1}]$$

S(l) for symbol index l may be defined as illustrated in Table 5.

TABLE 5

| Cyclic prefix length | S(3), ..., S(13) |
|---|---|
| Normal | 1  1  1  1  −1  −1  1  1  1  −1  1 |

The NSSS includes a combination of a ZC sequence of length 131 and a binary scrambling sequence such as a Hadamard sequence. The NSSS indicates a PCID to NB-IoT UEs within the cell by the combination of sequences. The NSSS may be generated by the following equation.

$$d(n) = b_q(m) e^{-j2\pi\theta_f n} e^{-j\frac{\pi u n'(n'+1)}{131}} \quad [\text{Equation 2}]$$

Variables applied to Equation 2 may be defined as follows.

$$n = 0, 1, \ldots, 131 \quad [\text{Equation 3}]$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

A binary sequence $b_q(m)$ may be defined as illustrated in Table 6, and $b_0(m)$ to $b_3(m)$ represent columns 1, 32, 64, and 128 of a Hadamard matrix of order 128. A cyclic shift $\theta_f$ for a frame number $n_f$ may be defined by Equation 4 below.

TABLE 6

| q | $b_q(0), \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 −1 1 1 −1 1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1] |
| 2 | [1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 −1 1 1 −1 1 −1 −1 1 −1 1 1 −1 −1 1 1 −1 1 −1 −1 1 1 −1 1 −1 −1 1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 −1 1 1 −1 1 −1 −1 1 1 −1 1 −1 −1 1 1 −1 −1 1 −1 −1 1 1] |
| 3 | [1 −1 −1 1 −1 1 1 −1 1 1 1 −1 −1 1 −1 1 1 −1 −1 1 −1 1 1 −1 1 −1 −1 1 1 −1 −1 1 −1 1 1 −1 −1 1 1 −1 1 −1 −1 1 −1 1 1 −1 −1 1 1 −1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 1 −1 −1] |

$$\theta_f = \frac{33}{132}(n_f/2) \bmod 4 \quad [\text{Equation 4}]$$

In Equation 4, nf represents a radio frame number and mod represents a modulo function.

The NRS, which is a reference signal for channel estimation required for demodulation of a DL physical channel, is generated in the same manner as in LTE. However, the NRS uses a narrowband-physical cell ID (NB-PCID) (or NCell ID or NB-IoT BS ID) as an initial value for initialization. The NRS is transmitted through one or two antenna ports (p=2000 and 2001).

The NPDCCH has the same transmission antenna configuration as the NPBCH, and delivers DCI. The NPDCCH supports three types of DCI formats. DCI format N0 includes scheduling information about a narrowband physical uplink shared channel (NPUSCH), and DCI formats N1 and N2 include NPDSCH scheduling information. The NPDCCH may be transmitted repeatedly up to 2048 times, for coverage enhancement.

The NPDSCH is used to transmit data (e.g., a TB) of a transport channel such as a DL-SCH or a paging channel (PCH). The NPDSCH has a maximum TBS of 680 bits and may be transmitted repeatedly up to 2048 times, for coverage enhancement.

Figure 9:
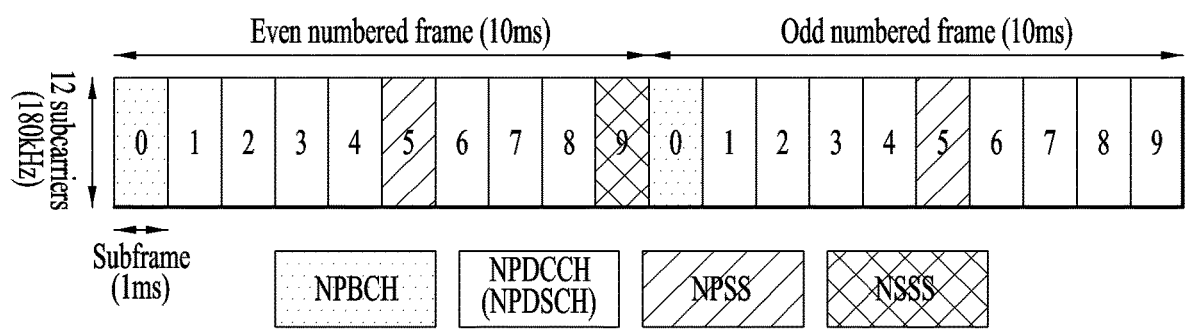
FIG. 9 illustrates positions at which NB-IoT downlink physical channels/signals are transmitted in an FDD LTE system.

FIG. 9 is a diagram illustrating positions at which NB-IoT DL physical channels/signals are transmitted in an FDD LTE system.

Referring to FIG. 9, the NPBCH is transmitted in the first subframe of each radio frame, the NPSS is transmitted in the sixth subframe of each radio frame, and the NSSS is transmitted in the last subframe (e.g., tenth subframe) of each even-numbered frame. An NB-IoT UE acquires frequency synchronization, symbol synchronization, and frame synchronization and searches 504 PCIDs (i.e., BS IDs) by synchronization signals (the NPSS and the NSSS). The LTS synchronization signals are transmitted in 6 PRBs, whereas the NB-IoT synchronization signals are transmitted in one PRB.

In NB-IoT, UL physical channels include a narrowband physical random access channel (NPRACH) and an NPUSCH, and support single-tone transmission and multi-tone transmission. Multi-tone transmission is supported only for an SCS of 15 kHz, and single-tone transmission is supported for SCSs of 3.5 kHz and 15 kHz. On UL, when the SCS is 15 kHz, orthogonality with the LTE system is maintained, thereby providing optimum performance. However, the 3.75-kHz SCS may destroy the orthogonality, resulting in performance degradation due to interference.

An NPRACH preamble includes four symbol groups, each including a CP and five (SC-FDMA) symbols. The NPRACH supports only single-tone transmission with the 3.75-kHz SCS and provides CPs of 66.7 µs and 266.67 µs in length to support different cell radiuses. Each symbol group is subjected to frequency hopping in the following hopping pattern. Subcarriers carrying the first symbol group are determined pseudo-randomly. The second symbol group hops by one subcarrier, the third symbol group hops by six subcarriers, and the fourth symbol group hops by one subcarrier. In the case of repeated transmissions, the frequency hopping procedure is repeatedly applied. To enhance coverage, the NPRACH preamble may be repeatedly transmitted up to 128 times.

The NPUSCH supports two formats. NPUSCH format 1 is used for UL-SCH transmission and has a maximum TBS of 1000 bits. NPUSCH format 2 is used for UCI transmission such as HARQ-ACK signaling. NPUSCH format 1 supports single-tone transmission and multi-tone transmission, whereas NPUSCH format 2 supports only single-tone transmission. In single-tone transmission, p/2-binary phase shift keying (BPSK) and p/4-quadrature phase shift keying (QPSK) may be used to reduce a peak-to-average power ratio (PAPR).

In the stand-alone and guard-band modes, all resources of one PRB may be allocated to NB-IoT. However, there is a constraint on resource mapping in the in-band mode, for co-existence with a legacy LTE signal. For example, resources (OFDM symbols 0 to 2 in each subframe) classified as a region allocated for LTE control channels may not be allocated to the NPSS and NSSS, and NPSS and NSSS symbols mapped to LTE CRS REs are punctured.

Figure 10:
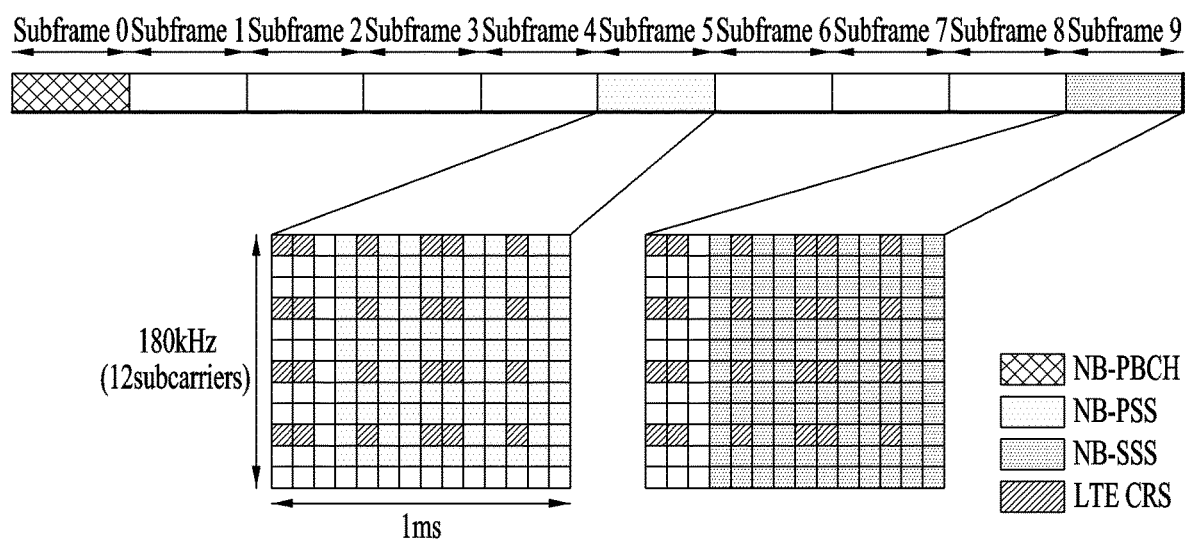
FIG. 10 illustrates resource allocation for an NB-IoT signal and an LTE signal in an in-band mode.

FIG. 10 is a diagram illustrating resource allocation to an NB-IoT signal and an LTE signal in the in-band mode. Referring to FIG. 10, for ease of implementation, the NPSS and NSSS are not transmitted in OFDM symbols corresponding to the control region of the legacy LTE system (the first three OFDM symbols of a subframe) regardless of an operation mode. NPSS/NSS REs colliding with LTE CRS REs in physical resources are punctured, for mapping without affecting the legacy LTE system.

After the cell search, the NB-IoT UE demodulates the NPBCH without system information except for a PCID.

Therefore, NPBCH symbols may not be mapped to the LTE control channel allocation region. Moreover, since the NB-IoT UE assumes four LTE antenna ports (e.g., p=0, 1, 2, and 3) and two NB-IoT antenna ports (e.g., p=2000 and 2001) in the situation without system information, the NB-IoT UE may not allocate the NPBCH to CRS REs and NRS REs. Therefore, the NPBCH is rate-matched according to available resources.

After demodulating the NPBCH, the NB-IoT UE may acquire information about the number of CRS antenna ports. However, the NB-IoT UE still may not acquire information about the LTE control channel allocation region. Therefore, the NPDSCH carrying system information block type 1 (SIB1) data is not mapped to resources classified as the LTE control channel allocation region.

However, unlike the NPBCH, REs which are not allocated to the LTE CRS may be allocated to the NPDSCH. Since the NB-IoT UE has acquired all information related to resource mapping after receiving SIB1, an eNB may map the NPDSCH (except for the case where SIB1 is transmitted) and the NPDCCH to available resources based on LTE control channel information and the number of CRS antenna ports.

Figure 11:
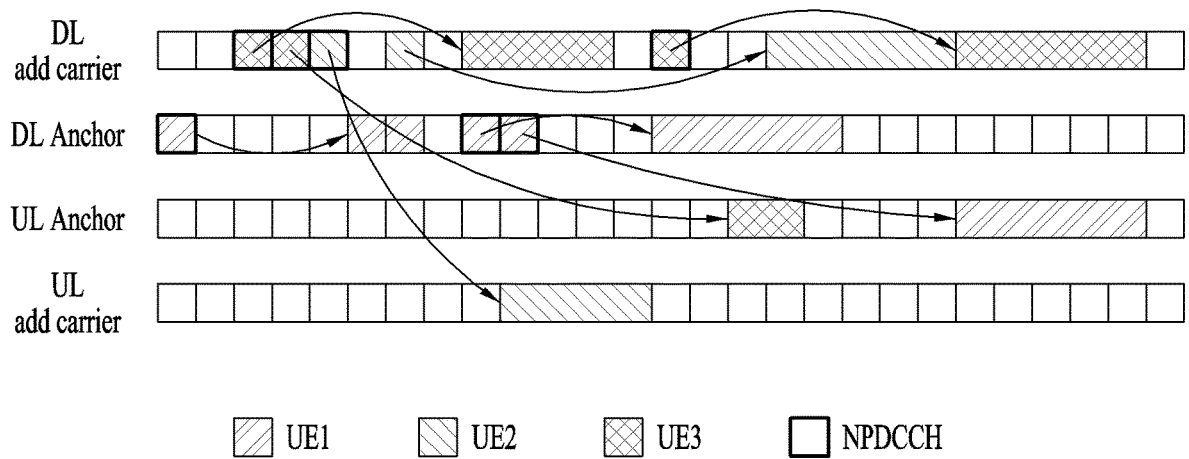
FIG. 11 illustrates multi-carrier scheduling.

FIG. 11 is a diagram illustrating an exemplary operation when multiple carriers are configured in FDD NB-IoT. In FDD NB-IoT, a DL/UL anchor carrier is basically configured, and a DL (and UL) non-anchor carrier may be additionally configured.

RRC_ConnectionReconfiguration may include information about the non-anchor carrier. When the DL non-anchor carrier is configured, a UE receives data only in the DL non-anchor carrier. In contrast, synchronization signals (NPSS and NSSS), a broadcast signal (MIB and SIB), and a paging signal are provided only in the anchor carrier. When the DL non-anchor carrier is configured, the UE listens to only the DL non-anchor carrier while the UE is in an RRC_CONNECTED state. Similarly, when the UL non-anchor carrier is configured, the UE transmits data only in the UL non-anchor carrier, not being allowed to transmit data simultaneously in the UL non-anchor carrier and the UL anchor carrier. When the UE transitions to an RRC_IDLE state, the UE returns to the anchor carrier.

In the illustrated case of FIG. 11, UE1 is configured only with anchor carriers, UE2 is configured additionally with a DL/UL non-anchor carrier, and UE3 is configured additionally with a DL non-anchor carrier. Accordingly, each UE transmits and receives data in the following carriers.

UE1: data reception (DL anchor carrier) and data transmission (UL anchor carrier)

UE2: data reception (DL non-anchor carrier) and data transmission (UL non-anchor carrier)

UE3: data reception (DL non-anchor carrier) and data transmission (UL anchor carrier)

The NB-IoT UE is not capable of simultaneous transmission and reception, and a transmission/reception operation is limited to one band. Therefore, even though multiple carriers are configured, the UE requires only one transmission/reception chain in a 180-kHz band.

Table 7 lists system information defined in NB-IoT. A system information acquisition/changing process is performed only in the RRC_IDLE state. The UE does not expect to receive an SIB in the RRC_CONNECTED state. When system information has been changed, the system information change may be indicated to the UE by paging or a direct indication. For the purpose of providing the changed system information, the eNB may transition the UE to the RRC_IDLE state.

TABLE 7

| System Information Block | Content |
| --- | --- |
| MIB-NB | Essential information required to receive further system information |
| SIB1-NB | Cell access and selection, other SIB scheduling |
| SIB2-NB | Radio resource configuration information |
| SIB3-NB | Cell re-selection information for intra-frequency, interfrequency |
| SIB4-NB | Neighboring cell related information relevant for intrafrequency cell re-selection |
| SIB5-NB | Neighboring cell related information relevant for interfrequency cell re-selection |
| SIB14-NB | Access Barring parameters |
| SIB16-NB | Information related to GPS time and Coordinated Universal Time (UTC) |

The MIB-NB is transmitted on the NPBCH and updated every 640 ms. The first transmission of the MIB-NB takes place in subframe #0 of a radio frame satisfying SFN mod κ, and the MIB-NB is transmitted in subframe #0 of every radio frame. The MIB-NB is transmitted in 8 independently decodable blocks, each block being transmitted repeatedly 8 times. Table 8 describes the configuration of fields of the M-NB.

TABLE 8

```
MasterInformationBlock-NB : := SEQUENCE {
    systemFrameNumber-MSB-r13      BIT STRING (SIZE (4)),
    hyperSFN-LSB-r13               BIT STRING (STZE (2)),
    schedulingInfoSIB1-r13         INTEGER (0 . . . 15),
    systemInfoValueTag-r13         INTEGER (0 . . . 31),
    ab-Enabled-r13                 BOOLEAN,
    operationModeInfo-r13          CHOICE {
        inband-SamePCI-r13             Inband-Same-PCI-NB-r13,
        inband-DifferentPCI-r13        Inband-DifferentPCI-NB-r13,
        guardband-r13                  Guardband-NB-r13,
        standalone-r13                 Standalone-NB-r13
    },
    spare                          BIT STRING (SIZE (11))
}
ChannelRasterOffset-NB-r13 ::= ENUMEMTED {khz–7dot5, khz–2dot5, khz2dot5, khz7dot5}
Guardband-NB-r13 ::= SEQUENCE {
    rasterOffset-r13               ChannelRasterOffset-NB-r13,
    spare                          BIT STRING (SIZE (3))
}
Inband-SamePCI-NB-r13 ::= SEQUENCE {
    eutra-CRS-SequenceInfo-r13     INTEGER (0 . . . 31)
}
Inband-DifferentPCI-NB-r13 ::= SEQUENCE {
    eutra-NumCRS-Ports-r13         ENUMERATED {same, four},
    rasterOffset-r13               channelRsterOffset-NB-r13,
    spare                          BIT STRING (SIZE (2))
}
Standa_one-NB-r13 ::= SEQUENCE {
    spare                          BIT STRING (SIZE (5))
}
```

The SIB1-NB is transmitted on the NPDSCH, with a periodicity of 2560 ms. The SIB1-NB is transmitted in subframe #4 of each of the even-numbered radio frames (i.e., 8 radio frames) of 16 consecutive radio frames. The indexes of the first radio frames carrying the SIB1-NB are derived according to an NPDSCH repetition number, Nrep and PCIDs. Specifically, when Nrep is 16 and the PCIDs are 2n and 2n+1, the indexes of the first radio frames are {0, 1}, and when Nrep is 8 and the PCIDs are 2n and 2n+1, the indexes of the first radio frames corresponding to the PCID of even numbers and the PCID of odd numbers are {0, 16}. Further, when Nrep is 4 and the PCIDs are 4n, 4n+1, 4n+2, and 4n+3, the indexes of the first radio frames are {0, 16, 32, 48}. The SIB1-NB is transmitted repeatedly Nrep times during 2560 ms, equally distributed across 2560 nm. The TBS and Nrep of the SIB1-NP are indicated by SystemInformationBlockType1-NB in the MIB-NB.

Table 9 lists NPDSCH repetition numbers according to SystemInformationBlockType1-NB.

TABLE 9

| Value of schedulingInfoSIB1 | Number of NPDSCH repetitions |
| --- | --- |
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

An SI message (i.e., information subsequent to the SIB2-NB) is transmitted within a time-domain window that occurs periodically. Scheduling information for the SI message is provided by the SIB1-NB. Each SI message is associated with one SI-window, and SI-windows of different SI messages do not overlap with each other. That is, only corresponding SI is transmitted within one SI-window. The lengths of the SI-windows are equal and configurable.

Figure 12:
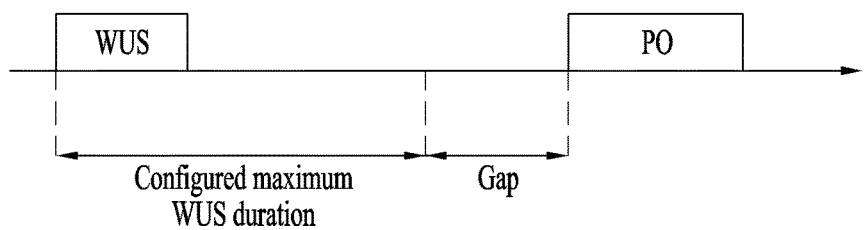
FIG. 12 illustrates a wake-up signal (WUS) transmission.

FIG. 12 illustrates an exemplary wake-up signal (WUS) transmission.

An NB-IoT UE or a bandwidth reduced low complexity/ coverage enhancement (BL/CE) UE may use a WUS to reduce the power consumption of paging monitoring according to a cell configuration. When the WUS is configured, the following operation in idle mode may be considered.

The WUS may indicate to the UE to receive paging in a corresponding cell by monitoring a machine type communication (MTC) PDCCH (MPDCCH) or NPDCCH.

For a UE which is not configured with extended discontinuous reception (eDRX), the WUS may be associated with one paging occasion (PO) (N=1). A PO refers to a time resource/duration (e.g., subframe or slot) in which a PDCCCH scrambled with a P-RNTI may be transmitted for paging. One or more POs may be included in one paging frame (PF), and a PF may be configured periodically based on a UE ID. The UE ID may be determined based on the international mobile subscriber identity (IMSI) of the UE.

For a UE configured with eDRX, the WUS may be associated with one or more POs (N≥1) within a paging transmission window (PTW). When eDRX is configured, a paging hyper-frame (PH) may be configured periodically based on a UE ID. The PTW is defined within the PH, and the UE monitors PO(s) in the PFs of the PTW.

Upon detection of the WUS, the UE may monitor subsequent N POs to receive a paging message.

A paging operation of a mobility management entity (MME) does not know that an eNB uses a WUS.

Referring to FIG. 12, the WUS may be transmitted in a "configured maximum WUS duration" (hereinafter, referred to as a WUS window) before a PO. Although the UE may expect repeated WUS transmissions within the WUS window, the actual number of WUS transmissions may be less than a maximum number of WUS transmissions in the WUS window. For example, a WUS repetition number may be small for a UE within good coverage. For convenience, resources/occasions in which the WUS is transmittable within the WUS window are referred to as WUS resources. The WUS resources may be defined by a plurality of consecutive OFDM symbols and a plurality of consecutive subcarriers. The WUS resources may be defined by a plurality of consecutive OFDM symbols and a plurality of consecutive subcarriers in a subframe or slot. For example, the WUS resources may be defined by 14 consecutive OFDM symbols and 12 consecutive subcarriers. There is a gap between a WUS window and a PO, and the UE does not monitor the WUS in the gap. Upon detection of the WUS in the WUS window, the UE may monitor a paging-related signal in one or more POs related to the WUS (window). In NB-IoT, an RRC_IDLE-state UE may receive paging in an anchor carrier or a non-anchor carrier based on system information.

Embodiment 1: WUS Sequence and WUS Scrambling

A method of distinguishing a plurality of corresponding channels (coCHs) by a WUS at a UE in a system in which the WUS may be used will be proposed below.

A WUS may be defined as a signal (or channel) available for the purpose of reducing the power consumption of coCH monitoring at a receiver, providing information for coCH monitoring, and providing some information about a coCH in advance. The coCH refers to a specific channel (or signal) about which transmission information may be acquired from the WUS at the receiver. The information about the coCH may be information related to coCH transmission/monitoring such as information indicating whether the coCH is transmitted, the monitoring periodicity of the coCH, the monitoring time of the coCH, the encoding scheme of the coCH, and so on. The information about the coCH may be part of information provided by the coCH. For example, the receiver may determine whether to monitor the coCH based on information included in the WUS. For example, the coCH may be a PDCCH, specifically a paging PDCCH. More specifically, the coCH may be a PDCCH scrambled with a P-RNTI. The PDCCH may be a repeatedly transmitted PDCCH such as an MPDCCH or NPDCCH.

When a plurality of coCHs exist for different UEs and are located adjacent to each other, time/frequency resources carrying WUSs may overlap with each other. In this case, when the WUSs are identical for all of the UEs, a UE may not determine whether a monitored WUS is related to a coCH that the UE is supposed to monitor, thus acquiring wrong information from the WUS. For example, when the WUS is used to indicate whether a paging NPDCCH is transmitted in NB-IoT, the UE may detect a WUS corresponding to a wrong PO and attempt NPDCCH decoding accordingly. In this case, the UE performs unnecessary NPDCCH monitoring, thereby causing power waste. In consideration of this situation, a method of enabling a UE to identify a WUS based on information related to its coCH will be proposed below.

In the present disclosure, a situation in which one cell manages a plurality of resource parts (RPs) is considered. A cell is a unit in which a UE accesses a network to acquire a synchronization signal and system information. The cell may preserve time-domain, frequency-domain, and space-domain resources for data transmission and reception by UEs, and schedule the resources for the UEs. An RP is a unit scheduled for a UE, for data transmission and reception of the UE, which is defined by dividing the time-domain, frequency-domain, and space-domain resources of the cell into one or more areas. For example, an MTC narrowband, an NB-IoT (anchor or non-anchor) carrier, an NR bandwidth part (BWP), or a beam index identified by beamforming may correspond to an RP. It is assumed that a WUS and a coCH corresponding to the WUS are operated in an RP. For example, when a UE camps on a specific RP, the UE may expect to monitor a WUS and a coCH in the RP. The following description is given with the appreciation that when a UE selects one of a plurality of RPs, a set of selectable RPs is defined as an RP list.

While one WUS corresponds to one coCH in the following description for convenience, the present disclosure is also applicable to a case in which one WUS corresponds to a plurality of coCHs. Further, while a DL transmission situation with a BS as a transmitter and a UE as a receiver is assumed in the following description, methods proposed by the present disclosure are also applicable to a UL transmission situation with a UE as a transmitter and a BS as a receiver. Further, while the following description is given in the context of a coCH existing for a WUS, the present disclosure is also applicable to a specific signal used for other purposes, other than the WUS (e.g., a signal used independently without a coCH for the signal).

While a method of setting parameters related to a WUS to deliver information related to a coCH is described in the following description, the same may be applied to a situation in which in the presence of mutually related signals or channels, a transmission scheme for another signal or channel is determined by one signal or channel.

Proposed methods of the present disclosure may be performed independently or in combination. When one or more methods are used in combination, a BS may determine how the methods are combined. Further, it is apparent that the proposed methods of the present disclosure may be performed in combination with other techniques which are not described in the present disclosure.

WUS Sequence and/or WUS Scrambling (Method 1.1) The sequence and/or scrambling of a WUS may be determined based on information related to a coCH occasion.

In this method, a coCH occasion may be time-domain resource (e.g., a radio frame, a subframe, a slot, or an OFDM symbol) carrying a coCH related to a WUS and/or frequency-domain resource (e.g., an RB) carrying the coCH.

For example, when the coCH is a PDCCH (MPDCCH or NPDCCH) indicating paging information, the coCH occasion may be a PO. Information related to the PO may include an index i_s used to determine the PO or a subframe number indicated by the index i_s in a radio frame. For example, i_s may be one of 0 to 3, indicating one of subframes #0, #4, #5, and #9 in a radio frame.

For example, when the coCH is a PDCCH (MPDCCH or NPDCCH) indicating paging information, the coCH occasion may be a PF. Information related to the PF may include an SFN indicating the PF or a value determined by a function using the SFN as a parameter.

For example, when the coCH is an MPDCCH or NPDCCH indicating paging information, the coCH occasion may be a narrowband (or partial narrowband) or a carrier. Information related to the narrowband (or partial narrowband) may include the index of a PRB belonging to the narrowband (or partial narrowband). Information related to the carrier may include a carrier list used to indicate a multi-carrier operation.

Information related to the coCH occasion may include one or more pieces of information. For example, when the coCH is a PDCCH (MPDCCH or NPDCCH) indicating paging information, the information related to the coCH occasion may include both information related to a PO and information related to a PF.

When this method is used, an adjacent UE may determine whether a monitored WUS is a signal related to a coCH that the UE expects, through a WUS sequence and/or WUS scrambling. For example, when the coCH is an NPDCCH for paging and transmission resources of WUSs indicating different coCHs fully or partially overlap with each other, the UE may calculate a sequence and/or a scrambling value to be used for a WUS by using information related to its PO, and attempt to detect the WUS based on the sequence and/or the scrambling value. Specifically, when a paging NPDCCH and a WUS are transmitted in a plurality of subframes as in NB-IoT, WUS transmission subframes may overlap with each other between adjacent POs. To identify a WUS for each PO, Method 1.1 may be applied.

When WUS resources are distinguished by coCHs, Method 1.1 may be applied as a method of calculating a WUS sequence and/or WUS scrambling by using information related to WUS resources, instead of information related to a coCH occasion. For example, the information related to WUS resources may include information about a WUS occasion in which a WUS transmission starts (or a WUS window configured to carry a WUS starts).

(Method 1.1-1) The information related to the coCH occasion may be used for the purpose of determining a WUS sequence.

For example, when the WUS is generated based on a Zadoff-Chu (ZC) sequence, a cyclic shift value applied to the ZC sequence may be determined based on the information related to the coCH occasion. For example, when a basic WUS transmission unit is defined as a length-131 ZC sequence spanning one subframe in an NB-IoT situation, 4 cyclic shift values may be defined in the form of a list. In this case, an actual cyclic shift value used for the WUS transmission may be determined based on the information related to the coCH occasion. To distinguish the coCH from the NSSS already using a length-131 ZC sequence, the cyclic shift value list may include values having good correlation properties (e.g., $\theta_f = \{1/8, 3/8, 5/8, 7/8\}$) with respect to the NSSS, which are configured or selected from among cyclic shift values other than those used for the NSSS.

In another example, when the WUS is generated based on a ZC sequence, a cover code multiplied to the ZC sequence may be determined based on the information related to the coCH occasion. When the basic WUS transmission unit is defined as a length-131 ZC sequence spanning one subframe in the NB-IoT situation, a Hadamard sequence or a Gold sequence may be used as the cover code. When a Hadamard sequence is used, available Hadamard sequence candidates may be listed, and the index of a sequence candidate to be used may be determined based on the information related to the coCH occasion. When a Gold sequence is used, an initialization value for the Gold sequence may be generated/determined based on the information related to the coCH occasion.

In another example, when the WUS is generated based on a ZC sequence, the root index of the ZC sequence may be determined based on the information related to the coCH occasion. When the basic WUS transmission unit is defined as a length-131 ZC sequence spanning one subframe in the NB-IoT situation, N root indexes available for each cell may be determined and N coCH occasions may be distinguished by the N root indexes.

In this method, the WUS sequence may be determined based on the information related to the coCH occasion, alone or in combination with other parameters.

(Method 1.1-2) The information related to the coCH occasion may be used for the purpose of determining an initialization value for a scrambling sequence applied to the WUS sequence.

For example, when the WUS is scrambled at a complex-valued symbol level, an RE level, an OFDM symbol level, a slot level, and/or a subframe level, a random sequence such as an LTE Gold sequence may be used. An initialization value $c_{init}$ for the random sequence may be determined based on the information related to the coCH occasion. In the case where the basic WUS transmission unit is defined as a length-131 ZC sequence spanning one subframe in the NB-IoT situation, when the WUS is scrambled with the LTE Gold sequence, the initialization value $c_{init}$ of the scrambling sequence may be determined based on information related to a PO.

The LTE Gold sequence c(i) may be defined by the following equation.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 5]}$$

In Equation 5, Nc is 1600 and the first m-sequence is initialized to $x_1(0)=1$ and $x_1(n)=0$ where n=1, 2, ..., 30. An initialization value for the second m-sequence is defined as $c_{init}=\Sigma_{i=0}^{30} x_2(i) \cdot 2^i$. The initialization value $c_{init}$ may be determined based on the information related to the PO (e.g., at least one of a radio frame number, a subframe index, a slot index, or an OFDM symbol index).

When the WUS is scrambled at a complex-valued symbol level or an RE level, the WUS scrambling may be performed in the following manner.

$$d'(n)=c'(n)*d(n) \quad \text{[Equation 6]}$$

Herein, c'(n) represents a complex-valued symbol sequence obtained from the LTE Gold sequence c(i). For example, when QPSK is applied, c(2i+1)c(2i) may correspond to c'(i). d(n) is the WUS sequence, d'(n) is the scrambled WUS sequence, and n is 0, 1, . . . , 131.

In this method, the initialization value of the scrambling sequence may be determined based on the information related to the coCH occasion, alone or in combination with other parameters.

Repetition Method

The WUS may be transmitted repeatedly for the purpose of coverage enhancement. In the following description, an RB in the time/frequency domain, which is used for a WUS repetition number of 1 is defined as the basic WUS transmission unit. The basic WUS transmission unit may include OFDM symbol(s), a slot, or a subframe in the time domain and RB(s) in the frequency domain.

(Method 1.2) When the WUS is repeated, the sequence and/or scrambling of the WUS may be maintained unchanged during the WUS repetitions.

For example, when the WUS sequence is determined according to Method 1.1-1, the value of the WUS sequence determined at the starting position of the WUS transmission may be maintained unchanged during the WUS repetitions. Specifically, when the basic WUS transmission unit is determined to be one subframe and repeated in NB-IoT, the WUS sequence may be maintained unchanged in each subframe during the WUS transmissions.

For example, when the initialization value of the scrambling sequence applied to the WUS is determined according to Method 1.1-2, the initialization value determined at the starting position of the WUS transmission may be maintained unchanged during the WUS repetitions. Specifically, when the basic WUS transmission unit is determined to be one subframe and repeated in NB-IoT, the scrambling sequence may be maintained unchanged in each subframe during the WUS transmissions.

This method may facilitate the UE to perform an operation such as coherent combining using a repetition during WUS detection (or decoding).

(Method 1.3) When the WUS is repeated, the WUS sequence and/or the WUS scrambling may be (re-)initialized at each repetition.

For example, when the WUS sequence is determined according to Method 1.1-1, a different WUS sequence may be determined at each repetition. Specifically, when the basic WUS transmission unit is determined to be one subframe and repeated in NB-IoT, a WUS sequence used in each subframe may be determined (independently) on a subframe basis during the WUS transmissions.

In another example, when the initialization value of the scrambling sequence applied to the WUS is determined according to Method 1-2, a different initialization value may be determined at each repetition. Specifically, when the basic WUS transmission unit is determined to be one subframe and repeated in NB-IoT, a scrambling sequence used in each subframe may be determined (independently) on a subframe basis during the WUS transmissions.

This method may be used for the purpose of achieving inter-cell interference randomization in a period during which WUS repetitions are applied, estimating a starting subframe by WUS detection, or randomizing interference between WUSs fully or partially overlapping with each other.

(Method 1.4) When the WUS is repeated, the WUS sequence and/or the WUS scrambling may be (re-)initialized in every predetermined period.

The predetermined period may be set to a multiple of the basic WUS transmission unit. For example, the basic WUS transmission unit may be one subframe, and the WUS sequence and/or the WUS scrambling may be (re-)initialized every N subframes. In this case, when the WUS sequence and/or the WUS scrambling is (re-)initialized in subframe #n, the same WUS sequence and/or WUS scrambling may be used in subframe #n to subframe #n+N−1, and (re-)initialized in subframe #n+N. Herein, only the number of subframes used for WUS transmission may be counted.

For example, when the WUS sequence is determined according to Method 1.1-1, a different WUS sequence may be determined at each repetition. For example, when the basic WUS transmission unit is determined to one subframe and repeated in NB-IoT, the WUS sequence used in each subframe may be (re-)initialized at every predetermined period during the WUS transmissions.

In another example, when the initialization value of the scrambling sequence for the WUS is determined according to Method 1.1-2, a different initialization value may be determined at each repetition. For example, when the basic WUS transmission unit is determined to one subframe and repeated in NB-IoT, the scrambling sequence used in each subframe may be (re-)initialized at every predetermined period during the WUS transmissions.

This method may be used for the purpose of achieving inter-cell interference randomization in a period during which WUS repetitions are applied, estimating a starting subframe by WUS detection, or randomizing interference between WUSs fully or partially overlapping with each other. Further, a period during which the same sequence and/or scrambling is maintained may be used to facilitate the UE to perform an operation such as coherent combining using a repetition during WUS detection (or decoding).

(Method 1.5-1) When Method 1.3 or Method 1.4 is used, the WUS sequence and/or the WUS scrambling may be determined based on the index of resources carrying each basic WUS transmission unit.

The resource index may be a time-domain resource index such as the index of an (OFDM) symbol, a slot, and/or a subframe carrying the basic WUS transmission unit. Specifically, when the basic WUS transmission unit is determined to one subframe and repeated in NB-IoT, the number of a subframe in a radio frame (or the number of a slot in the subframe) may be used to determine the WUS sequence and/or the WUS scrambling.

(Method 1.5-2) When Method 1.3 or Method 1.4 is used, the WUS sequence and/or the WUS scrambling may be determined based on the number of repetitions which have been performed during a period from the starting time of the WUS transmissions to the transmission of each basic WUS transmission unit.

The starting time of the WUS transmissions may be a position at which the WUS transmissions actually start or a position at which a WUS window configured for the WUS transmissions starts. The number of repetitions which have been performed until the transmission time of the basic WUS transmission unit may be determined to be the total number of basic WUS transmission units transmitted before a corresponding one of total repeated basic WUS transmission units (within the WUS window). Specifically, when the basic WUS transmission unit is determined to be one subframe and repeated in NB-IoT, the number of subframes used for the WUS transmissions from the start of the WUS repetitions to a corresponding WUS subframe may be used to determine a WUS sequence and/or WUS scrambling.

Sequence Design and Operation Mode

In NB-IoT, the number of OFDM symbols available for DL may be different according to an operation mode. In NB-IoT, for example, a DL signal may be transmitted in all OFDM symbols of one subframe in the guard-band mode and the stand-alone mode, whereas a DL signal may not occupy up to three first OFDM symbols of a subframe to protect an LTE control region in the in-band mode.

(Method 1.6) The same WUS sequence generation and mapping method is applied to the $4^{th}$ to $14^{th}$ OFDM symbols of one subframe irrespective of operation modes.

When a different WUS structure is used according to an operation mode, the UE should be provided with all WUS receivers for the respective operation modes, thereby increasing UE complexity and cost. To solve the problem, it is proposed in the present disclosure that a common WUS generation and mapping method is used at the positions of OFDM symbols ($4^{th}$ to $14^{th}$ OFDM symbols) equally used in the in-band, guard-band, and stand-alone modes. In this case, the UE may always expect the same type of WUS transmission in the OFDM symbols at the positions, and a receiver used for WUS reception in the in-band mode may be reused for WUS reception in the guard-band and stand-alone modes.

According to operation modes, Method 1.6-1 and Method 1.6-2 may be used as WUS sequence generation and mapping methods for a duration (e.g., $1^{st}$ to $3^{rd}$ OFDM symbols) used as the LTE control region in a subframe.

(Method 1.6-1) When Method 1.6 is used and the operation mode is the in-band mode, the UE does not expect the WUS in the duration between the $1^{st}$ OFDM symbol and the $3^{rd}$ OFDM symbol.

In the in-band mode, up to three first OFDM symbols of a subframe may not be used for NB-IoT, for transmission in the LTE control region. Herein, the UE may identify the accurate size of the LTE control region through a signaling from the eNB, thus not expecting DL data transmission in the OFDM symbol periods.

To simplify the WUS receiver structure of the UE, a method of allowing the UE to expect one fixed WUS transmission type may be considered in the in-band mode. For this purpose, up to three first OFDM symbols of a subframe, which may be configured as the LTE control region, may always be excluded from WUS transmission in the in-band mode.

(Method 1.6-2) When Method 1.6 is used, the UE may expect the WUS in all OFDM symbols which are not included in the LTE control region.

As the UE receives more OFDM symbols, the UE may have better performance during WUS detection. In the guard-band and stand-alone modes, the LTE control region does not exist and thus all OFDM symbols are available for WUS transmission. Further, the number of available OFDM symbols may vary according to the size of the LTE control region in the in-band mode.

In consideration of these features, the present disclosure proposes a method of using all OFDM symbols which are not used for an LTE control region, for a WUS. When Method 1.6 is applied, the same WUS generation and mapping method may always be applied to a duration spanning from the $4^{th}$ OFDM symbol to the $14^{th}$ OFDM symbol irrespective of the presence or absence of the LTE control region or the size of the LTE control region.

One of the following options may be used as a WUS generation and mapping method at the positions of OFDM symbols available for WUS transmission in the duration of the $1^{st}$ to $3^{rd}$ OFDM symbols.

(Option 1.6-2-a) A part of a WUS transmitted in the $4^{th}$ to $14^{th}$ OFDM symbols may be repeated on a (OFDM) symbol basis in the $1^{st}$ to $3^{rd}$ OFDM symbols.

The indexes of OFDM symbols to be repeated between the $1^{st}$ OFDM symbol and the $3^{rd}$ OFDM symbol may be selected from among the $4^{th}$ to $14^{th}$ OFDM symbols (1) in a predetermined pattern specified in a technical specification (see FIGS. 13 to 15) or (2) randomly. When the pattern of OFDM symbol indexes is predetermined by the technical specification, the UE may always perform a regular operation. In contrast, when the OFDM symbol indexes are randomly selected, a diversity gain may be achieved based on a structure of repeating a plurality of OFDM symbols. For example, the OFDM symbol indexes may be determined in the form of a random sequence calculated by an SFN.

Figure 13:
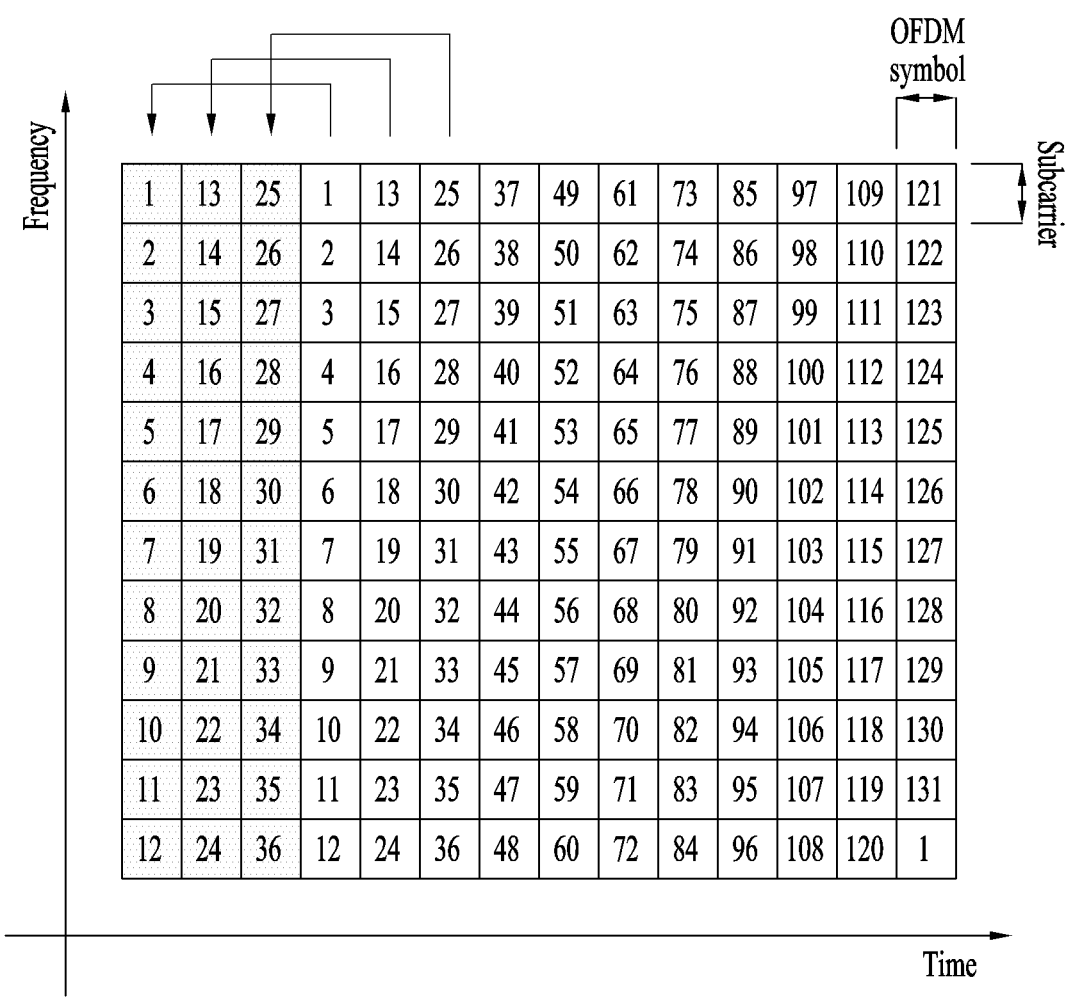
FIGS. 13 to 16 illustrate WUS transmissions according to the present disclosure.

FIG. 13 illustrates an example of the proposed method. In FIG. 13, WUS resources are shown, each box represents an RE, and a numeral written in the RE represents indexes of the values/symbols constituting a WUS sequence. When the WUS sequence is configured based on a length-131 sequence (e.g., ZC sequence), the WUS sequence d(n) may be determined by the following equation.

$$d(n) = w_1(n) \cdot w_2(n) = w_1(n) \cdot e^{-\frac{j\pi um(m+1)}{131}} \qquad \text{[Equation 7]}$$

In Equation 7, n=0, 1, . . . , 130, m=n mod 131, u represents a root sequence index, and $w_1(n)$ may be a scrambling sequence with complex values as elements. Method 1.1, Method 1.1-1, and Method 1.1-2 may be applied to a WUS sequence/WUS scrambling. In FIG. 13, the numerals 1 to 131 in the REs correspond to the WUS sequence d(0) to d(130).

Referring to FIG. 13, in the guard-band or stand-alone mode, a WUS sequence located in three consecutive OFDM symbols (e.g., the $4^{th}$ to $6^{th}$ OFDM symbols) among the $4^{th}$ to $14^{th}$ OFDM symbols may be repeated in the $1^{st}$ to $3^{rd}$ OFDM symbols in a subframe allocated for WUS transmission. Accordingly, a length-36 sequence d(0) to d(35) (i.e., 1 to 36) may be mapped to the $1^{st}$ to $3^{rd}$ OFDM symbols, and a length-132 sequence d(0) to d(130) and d(0) (i.e., 1 to 131 and 1) may be mapped to the $4^{th}$ to $14^{th}$ OFDM symbols. In contrast, in the in-band mode, the eNB maps no WUS to the $1^{st}$ to $3^{rd}$ OFDM symbols, and the UE does not expect any WUS in the period of the $1^{st}$ to $3^{rd}$ OFDM symbols. Accordingly, when the operation mode is the in-band mode, the UE may expect the WUS only in the $4^{th}$ to $14^{th}$ OFDM symbols, as illustrated. When an RS (e.g., CRS or NRS) exists in the WUS resources, the WUS sequence may be punctured.

(Option 1.6-2-b) The WUS sequence used in the $4^{th}$ to $14^{th}$ OFDM symbols may be mapped to REs in the $1^{st}$ to $3^{rd}$ OFDM symbols in a cyclic repetition manner.

For example, the WUS sequence may be mapped from in the first OFDM symbol available for WUS transmission (e.g., the $4^{th}$ OFDM symbol) to the last OFDM symbol available for WUS transmission, calculated by performing a modular operation on the length of the WUS sequence. When Method 1.6 is applied, the starting position of WUS mapping may be adjusted by an offset, so that a predetermined WUS sequence mapping rule may always be applied to the $4^{th}$ to $14^{th}$ OFDM symbols. Equation 8 represents an example of the above method as an equation. In the following equation, a WUS sequence is expressed as the product of a plurality of sequences.

$$d(n) = \prod_i w_i[(n+s_i) \bmod N_i] \quad \text{[Equation 8]}$$

In Equation 8, Π represents a product function, i represents an index for distinguishing the type of a WUS sequence, $s_i$ represents an offset that maintains a $w_i$ value consistent in the $4^{th}$ to $14^{th}$ OFDM symbols irrespective of the number of available OFDM symbols, and $N_i$ represents the length of a $w_i$ sequence. For example, $N_i$ is 131 for a length-131 ZC sequence.

Figure 14:
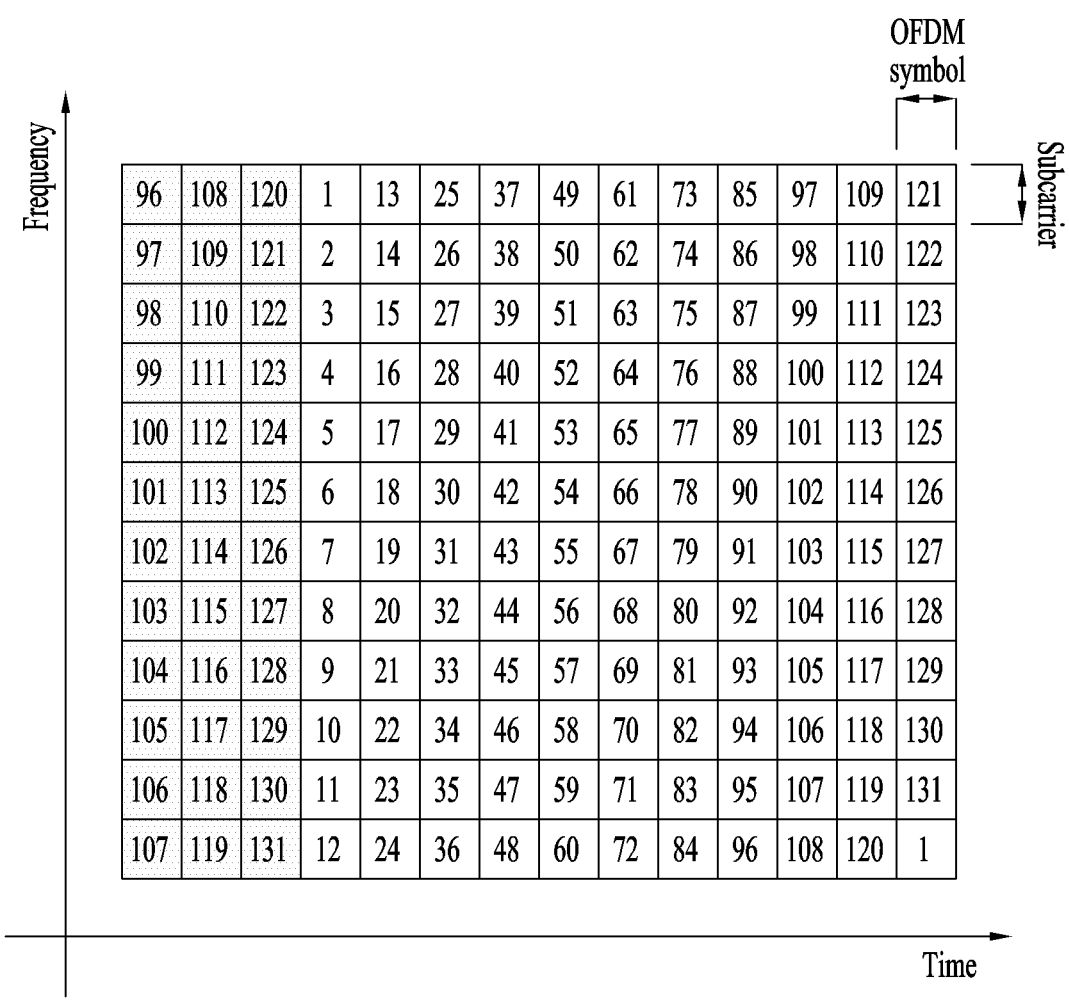

FIG. 14 illustrates an example of the proposed method based on Equation 8. In FIG. 14, WUS resources are shown, each box represents an RE, and the numerals written in the REs represent indexes of the values/symbols constituting a WUS sequence. Specifically, numerals 1 to 131 in the REs correspond to d(0) to d(130) of the WUS sequence. FIG. 14 illustrates an example in which $s_i$ is 96 and $N_i$ is 131 in Equation 8. Referring to FIG. 14, in the guard-band or stand-alone mode, the WUS sequence is cyclically shifted such that the first value of the WUS sequence is mapped, starting from the index of the $1^{st}$ subcarrier of the $4^{th}$ OFDM symbol. Accordingly, a length-36 sequence d(95) to d(130) (i.e., 96 to 131) may be mapped to the $1^{st}$ to $3^{rd}$ OFDM symbols, and a length-132 sequence d(0) to d(130) and d(0) (i.e., 1 to 131 and 1) may be mapped to the $4^{th}$ to $14^{th}$ OFDM symbols. In contrast, in the in-band mode, the eNB does not map the WUS to the $1^{st}$ to $3^{rd}$ OFDM symbols, and the UE does not expect the WUS in the duration of the $1^{st}$ to $3^{rd}$ OFDM symbols. Accordingly, when the operation mode is the in-band mode, the UE may expect the WUS only in the $4^{th}$ to $14^{th}$ OFDM symbols, as illustrated. When an RS (e.g., CRS or NRS) exists in the WUS resources, the WUS sequence may be punctured.

Equation 9 is an example of representing another proposed method of the present disclosure as an equation, when the operation mode is the guard-band or stand-alone mode. In the following equation, a WUS sequence is expressed as the product of a plurality of sequences.

$$d(n) = \begin{cases} \prod_i w_i[(n+t_i) \bmod N_i] & 1^{st} \text{ OFDM symbol~} \\ & 3^{rd} \text{ OFDM symbol} \\ \prod_i w_i[(n+s_i) \bmod N_i] & 4^{th} \text{ OFDM symbol~} \\ & 14^{th} \text{ OFDM symbol} \end{cases} \quad \text{[Equation 9]}$$

In Equation 9, Π represents a product function, i represents an index indicating the type of a WUS sequence, $s_i$ represents an offset that maintains a $w_i$ value consistent in the $4^{th}$ to $14^{th}$ OFDM symbols irrespective of the number of available OFDM symbols, $t_i$ represents an offset for linking the index of the last WUS sequence mapped to the $14^{th}$ OFDM symbol to the index of the WUS sequence starting in the $1^{st}$ OFDM symbol, and $N_i$ represents the length of a $w_i$ sequence. For example, $N_i$ is 131 for a length-131 ZC sequence.

Figure 15:
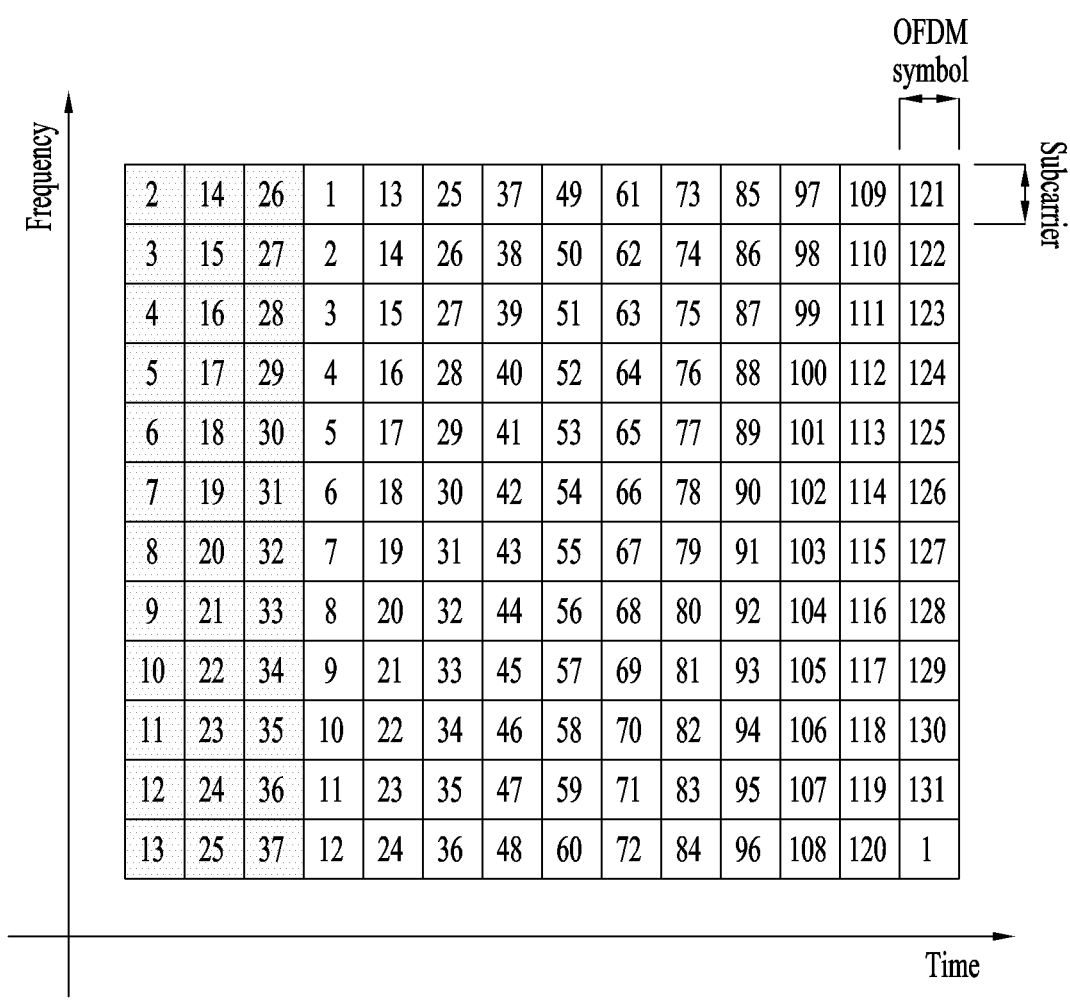

FIG. 15 illustrates an example of the proposed method based on Equation 9. In FIG. 15, WUS resources are shown, each box represents an RE, and the numerals written in the REs represent indexes of the values/symbols constituting a WUS sequence. Specifically, numerals 1 to 131 in the REs correspond to d(0) to d(130) of the WUS sequence. FIG. 15 illustrates an example in which $s_i$ is 96, $t_1$ is 1, and $N_i$ is 131 in Equation 9. Referring to FIG. 15, in the guard-band or stand-alone mode, mapping of the WUS sequence may start from the index of the $1^{st}$ subcarrier in the $4^{th}$ OFDM symbol, end at the last RE of the $14^{th}$ OFDM symbol, and then continue to the $1^{st}$ subcarrier index of the $1^{st}$ OFDM symbol. Accordingly, a length-36 sequence d(1) to d(36) (i.e., 2 to 37) may be mapped to the $1^{st}$ to $3^{rd}$ OFDM symbols, and a length-132 sequence d(0) to d(130) and d(0) (i.e., 1 to 131 and 1) may be mapped to the $4^{th}$ to $14^{th}$ OFDM symbols. In contrast, in the in-band mode, the eNB does not map the WUS to the $1^{st}$ to $3^{rd}$ OFDM symbols, and the UE does not expect the WUS in the period of the $1^{st}$ to $3^{rd}$ OFDM symbols. Accordingly, when the operation mode is the in-band mode, the UE may expect the WUS only in the $4^{th}$ to $14^{th}$ OFDM symbols, as illustrated. When an RS (e.g., CRS or NRS) exists in the WUS resources, the WUS sequence may be punctured.

(Method 1.7) The same WUS sequence generation method is applied to one subframe irrespective of operation modes, and sequence mapping starts in the first available (OFDM) symbol of the subframe.

When WUS structures are different according to operation modes, the UE should be provided with all WUS receivers for the respective operation modes, thereby increasing UE complexity and cost. To solve the problem, the present disclosure proposes a method of using a common WUS generation method in some OFDM symbols in the in-band, guard-band, and stand-alone modes. Further, it may be configured that the WUS sequence always starts in the first OFDM symbol available for WUS transmission (e.g., the $4^{th}$ OFDM symbol) in a subframe. In this case, the UE may expect a common WUS transmission type in all operation modes. For example, a WUS type in the $4^{th}$ to $14^{th}$ OFDM symbols in the in-band mode may be equal to a WUS type in the $1^{st}$ to $11^{th}$ OFDM symbols in the guard-band/stand-alone mode. In this case, a receiver used for WUS reception in the in-band mode may be reused for WUS reception in the guard-band and stand-alone modes. Further, because a WUS sequence is generated in the same equation, structure, and mapping order, its standardization and implementation may be relatively simple.

For example, mapping of the WUS sequence may start in the first OFDM symbol available for WUS transmission and end in the last OFDM symbol available for WUS transmission, determined by a modular-operation of the length of the WUS sequence. A common WUS sequence generation rule or equation may be used irrespective of the operation modes. The following equation exemplifies this method.

$$d(n) = \prod_i w_i[n \bmod N_i] \quad \text{[Equation 10]}$$

Figure 16:
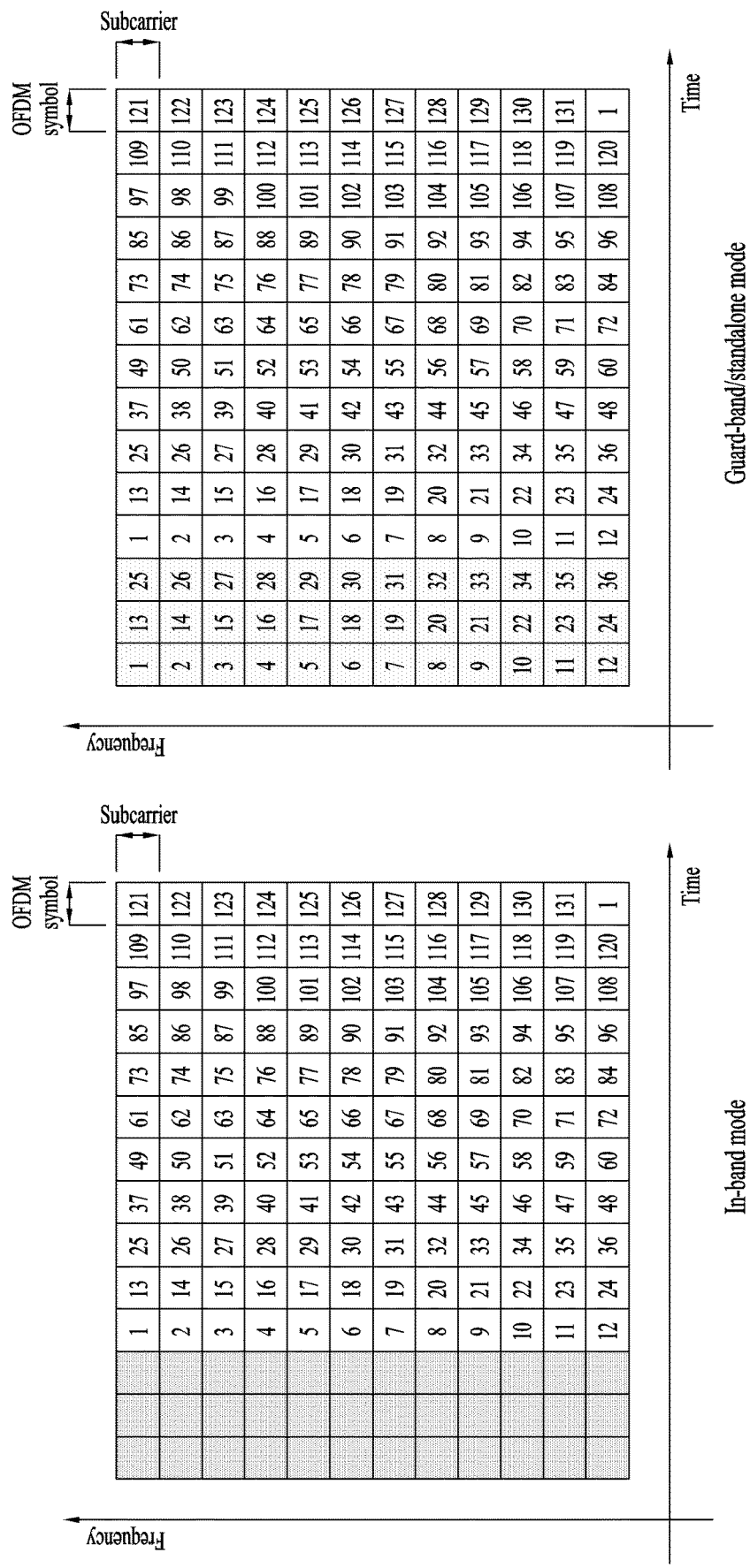

FIG. 16 illustrates an example of the proposed method based on Equation 10. In FIG. 16, each box represents an RE and the numerals in the REs represent indexes of the values/symbols constituting the WUS sequence. Specifically, numerals 1 to 131 in the REs corresponding to a WUS sequence d(0) to d(130). In FIG. 16, a WUS sequence in the $4^{th}$ to $14^{th}$ OFDM symbols in the in-band mode may be identical in type to a WUS sequence in the $1^{st}$ to $11^{th}$ OFDM symbols in the guard-band/stand-alone mode.

Embodiment 2: Scrambling

A scrambling technique used in the case of repeated transmissions of a physical channel (or signal) is proposed below. When some of positions available for two or more physical channels (or signals) overlap with each other, the proposed method may be used to distinguish them.

In NB-IoT/MTC, a technique of repeatedly transmitting the same physical channel (or signal) may be used for the purpose of coverage extension. For example, in NB-IoT/MTC, repetitions may occur on a subframe basis and scrambling may be applied to subframes (or slots) to identify inter-cell information and randomize interference. Specifically, a physical channel (or signal) (e.g., PDCCH or PDSCH) may be repeated in NRep (>=1) valid DL subframes in NB-IoT/MTC. The valid DL subframes include BL/CE subframes. The physical channel (or signal) is transmitted, spanning $N_{abs}$ subframes. The $N_{abs}$ subframes include non-BL/CE subframes. When NRep (>=1) repeated transmissions are performed, the same scrambling sequence is applied to the physical channel (or signal) on a subframe block basis. A subframe block includes Nacc consecutive subframes, and Nacc may be 1 or 4 in FDD and 1 or 10 in TDD. Specifically, the physical channel (or signal) may be scrambled in the following manner.

The bit blocks $b(0), \ldots, b(M_{bit}-1)$ of a physical channel (or signal) are scrambled into scrambled bit blocks $d(0), \ldots, d(M_{bit}-1)$. Mw is the total number of bits.

$$d(i)=(b(i)+c(i)) \mod 2 \qquad \text{[Equation 11]}$$

In Equation 11, c(i) is a UE-specific scrambling sequence, for which Equation 5 may be referred to.

For an MPDCCH, the initialization value c(i) of the scrambling sequence in a $j^{th}$ subframe block may be defined as $$c_{init} = \qquad \text{[Equation 12]}$$

$$\begin{cases} [(j_0+j)N_{acc} \mod 10] \cdot & \text{for Type1-Common,} \\ 2^9 + N_{ID}^{cell} & \text{for Type2-Common} \\ [(j_0+j)N_{acc} \mod 10] \cdot & \\ 2^9 + n_{ID,m}^{MPDCCH} & \text{otherwise} \end{cases}, \text{where}$$

$$j = 0, 1, \ldots, \left\lfloor \frac{i_0 + N_{abs}^{MPDCCH} + i_\Delta - 1}{N_{acc}} \right\rfloor - j_0$$

$$j_0 = \lfloor (i_0 + i_\Delta)/N_{acc} \rfloor$$

$$i_\Delta =$$

$$\begin{cases} 0, & \text{for } framestructuretype1 \text{ or } N_{acc} = 1 \\ N_{acc} - 2, & \text{for } framestructuretype2 \text{ and } N_{acc} = 10 \end{cases}$$

In Equation 12, $i_0$ represents the absolute subframe number (ASN) of the first DL subframe intended for MPDCCH transmission. The ASN is defined as $10n_f+I$ where nf represents an SFN and i is one of 0 to 9. $N_{abs}^{MPDCCH}$ represents the number of consecutive subframes that the MPDCCH transmission spans, including a non-BL/CE subframe in which the MPDCCH transmission is postponed.

Further, physical channels (or signals) serving different purposes may be distinguished by their starting subframes in NB-IoT/MTC. For example, in the case of a search space in which a paging NPDCCH is transmittable, the position of the starting subframe of the paging NPDCCH may be determined according to a UE ID.

Figure 17:
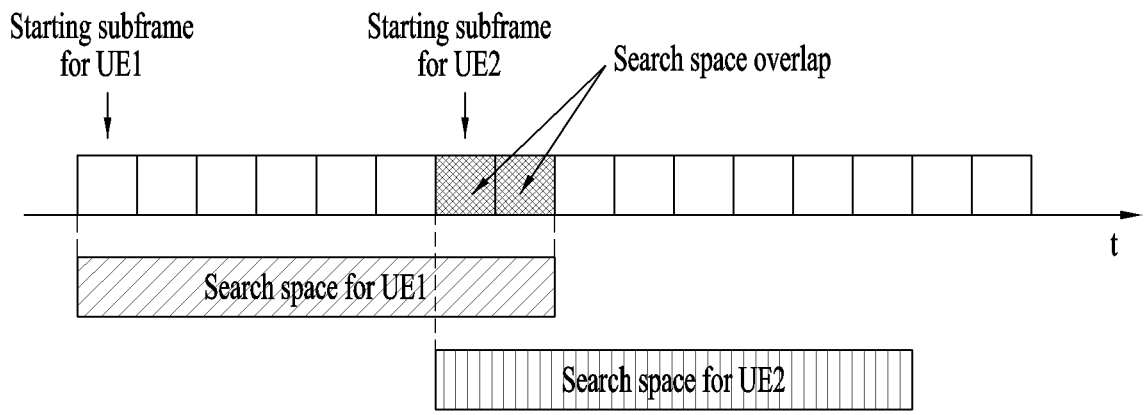
FIG. 17 illustrates signal collision during repeated transmissions.

In an example of an operation of an NB-IoT UE for monitoring a paging NPDCCH based on the above methods, the UE calculates the position of a PO (starting subframe/slot) of a Type1-CSS (a search space in which the paging NPDCCH is monitored) based on its UE ID and determines a search space period from the position according to a repetition size. When the interval between POs for different UEs is D and the size of the Type1-CSS is R, it may occur that D<R. In this case, Type1-CSSs for the different UEs overlap partially with each other. Without a method of distinguishing NPDCCHs corresponding to the respective POs from each other, the UE may mistake an NPDCCH directed to another UE for an NPDCCH directed to the UE, and thus a false alarm may occur. Particularly, the problem may be more important in TDD. For example, when DRX is applied to TDD NB-IoT at the same level as FDD NB-IoT, the number of DL subframes in one radio frame is limited. Therefore, overlap between search spaces caused by NPDCCH repetitions may occur more often. FIG. 17 illustrates an example of overlap between search spaces of different UEs according to a configuration of the positions and lengths of the starting subframes of NPDCCH transmissions.

To avoid this phenomenon, (1) a DRX increase for widening the interval between POs may increase the latency of the UE, (2) an increase in the size of a UE group included in each PO, for widening the interval between POs may lead to unnecessary wake-up, and hence an increase in the power consumption of the UE, and (3) reduced repetitions may decrease a coverage level. Accordingly, there is a need for a method of enabling each UE to determine whether an NPDCCH is directed to the UE, while allowing a configuration that leads to overlap between search spaces.

To solve the above problem, the present disclosure proposes a method of distinguishing physical channels (or signals) for different UEs by scrambling in a situation in which a physical channel (or signal) is repeatedly transmitted. While the present disclosure is described in the context of the NPDCCH, the present disclosure is also generally applicable to transmission of a physical channel (or signal) in a general communication system using repeated transmissions.

The following proposed methods may be used alone or in combination unless contracting each other.

[Method 2.1] An initialization value used to generate a scrambling sequence may be determined based on the value of a starting position at which transmission of a physical channel (or signal) starts.

In this method, information about the starting position may include an SFN or ASN in which a period (e.g., a search space for NPDCCH monitoring) pre-agreed/scheduled for the transmission of the physical channel (or signal) starts. Even though an actual transmission starting position is postponed, the information about the starting position may be determined based on the starting position of the pre-agreed/scheduled period. For example, given the position of the starting subframe of the search space as $n_0$, when this position corresponds to an invalid DL subframe, the actual stating position of the transmission of the physical channel (or signal) may be postponed to a valid subframe after no. Nonetheless, the information about the starting position may be determined based on no, when the initialization value of the scrambling sequence is determined.

For example, repeated transmissions may be performed on a subframe basis, the scrambling sequence may be an LTE Gold sequence, and the ASN value of the starting subframe may be $n_{f\text{-}start}$. The initialization value $c_{init}$ of the LTE Gold sequence may be determined based on at least one of $n_{f\text{-}start}$, $n_s$ (a slot index (e.g., 0~19) in a radio frame) or $n_{sf}$ (a subframe index (e.g., 0~9) in the radio frame) at which the actual transmission starts, or $N_{ID}^{Ncell}$ (cell ID).

The initialization value of the scrambling sequence may be (re-)initialized every $N_c$ DL subframes used for the transmission ($N_c \geq 1$). For example, when the scrambling sequence is (re-)initialized in an $n_i^{th}$ subframe, the same scrambling sequence may be applied to $n_i^{th}$ to $(n_i+N_c-1)^{th}$ subframes.

The following equation describes $c_{init}$ the above example.

$$c_{init} = (n_{f\text{-}start} \bmod \alpha) * \beta + \lfloor n_s/2 \rfloor * 2^9 + N_{ID}^{Ncell} \quad \text{[Equation 13]}$$

In Equation 13, a modular operation for a may be defined for the purpose of controlling the number of available $c_{init}$ values or preventing redundant uses of $c_{init}$ under different conditions. The value of $\alpha$ (e.g., $2^{10}$ or $2^{11}$ for NB-IoT) may be determined in consideration of a maximum repetition number for the physical channel (or signal), or may be determined to be any large value in consideration of the influence of a subframe unavailable as a DL valid subframe, such as an invalid subframe or a UL subframe. Even in the absence of the modular operation for a in the above equation, the technical idea of the present disclosure may also be applied in the same manner.

In the equation, $\beta$ may be defined for the purpose of preventing redundant uses of $c_{init}$. $\beta$ may be determined to be $2^{13}$ or larger to prevent redundant uses of a value determined based on $n_s$ and $N_{ID}^{Ncell}$.

In another example, repeated transmissions may occur on a subframe basis, the scrambling sequence may be an LTE Gold sequence, and the ASN of the starting subframe may be $n_{f\text{-}start}$. The initialization value $c_{init}$ of the LTE Gold sequence may be determined based on at least one of $n_{f\text{-}start}$, $N_{acc}$ (the number of consecutive ASNs in which the same scrambling sequence is maintained), or $N_{ID}^{Ncell}$ (cell ID).

The scrambling sequence may be (re-)initialized every $N_{acc}$ ASNs ($N_{acc} \geq 1$). When the scrambling sequence is (re-)initialized in an $n_i^{th}$ ASN, the same scrambling sequence may be applied to $n_i^{th}$ to $(n_i+N_{acc}-1)^{th}$ ASNs.

The following equation describes $c_{init}$ in the above example.

$$C_{init} = (n_{f\text{-}start} \bmod \alpha) * \beta + [(j_0+j_1)N_{acc} \bmod 10] * 2^9 + N_{ID}^{Ncell} \quad \text{[Equation 14]}$$

In Equation 14, a modular operation for $\alpha$ may be defined for the purpose of controlling the number of available $c_{init}$ values or preventing redundant uses of $c_{init}$ under different conditions. The value of $\alpha$ (e.g., $2^{10}$ or $2^{11}$ for NB-IoT) may be determined in consideration of a maximum repetition number for the physical channel (or signal), or may be determined to be any large value in consideration of the influence of a subframe unavailable as a DL valid subframe, such as an invalid subframe or a UL subframe. Even in the absence of the modular operation for $\alpha$ in the above equation, the technical idea of the present disclosure may also be applied in the same manner.

In the equation, $\beta$ may be defined for the purpose of preventing redundant uses of $c_{init}$. $\beta$ may be determined to be $2^{13}$ or larger to prevent redundant uses of a value determined based on $n_s$ and $N_{ID}^{Ncell}$.

In the equation, j0 represents the index of a subframe block in which the transmission starts, and j represents the order of subframes in the j0$^{th}$ subframe block. A subframe block includes Nacc consecutive subframes. For an MPDCCH, j0 and j may be defined as follows. The same definition may also apply to other channels.

$$j = 0, 1, \ldots, \left\lfloor \frac{i_0 + N_{abs}^{MPDCCH} + i_\Delta - 1}{N_{acc}} \right\rfloor - j_0 \quad \text{[Equation 15]}$$

$$j_0 = \lfloor (i_0 + i_\Delta)/N_{acc} \rfloor$$

$$i_\Delta = \begin{cases} 0, & \text{for frame structure type 1 or } N_{acc} = 1 \\ N_{acc} - 2, & \text{for frame structure type 2 and } N_{acc} = 10 \end{cases}$$

In Equation 15, $i_0$ represents the ASN of the first subframe in which the transmission starts. $N^{MPDCCH}_{abs}$ represents the number of consecutive subframes spanned by the MPDCCH transmission, including a non-BL/CE subframe in which MPDCCH transmission is postponed.

[Method 2.2] An initialization value used to generate a scrambling sequence may be determined based on a relative position value from a starting position at which transmission of a physical channel (or signal) starts.

In this method, information about the relative position from the starting position may be determined based on the number of DL valid subframes used for the transmission of the physical channel (or signal) after the starting subframe of a period (e.g., a search space for NPDCCH monitoring) pre-agreed/scheduled for the transmission of the physical channel (or signal) and the total number $N_{abs}$ of absolute subframes after the starting subframe of the transmission of the physical channel (or signal). Even though an actual transmission starting position is postponed, the information about the starting position may be determined to be the starting position of the pre-agreed/scheduled period. For example, given the position of the starting subframe of the search space as $n_0$, this position may correspond to an invalid DL subframe. In this case, the actual starting position of the transmission of the physical channel (or signal) may be postponed to a valid subframe after $n_0$. Nonetheless, the information about the starting position may be assumed to be $n_0$, when the initialization value of the scrambling sequence is determined.

For example, repeated transmissions may occur on a subframe basis, and the scrambling sequence may be an LTE Gold sequence. In this case, the initialization value $c_{init}$ of the LTE Gold sequence may be determined based on at least one of $N_{abs}$ or $N_{ID}^{Ncell}$ (cell ID). $N_{abs}$ represents the total number of DL subframes spanned by the transmission of the physical channel (or signal), including an invalid DL subframe.

The initialization value of the scrambling sequence may be (re-)initialized every $N_c$ DL subframes used for the transmission ($N_c \geq 1$). For example, when the scrambling sequence is (re-)initialized in an $n_i^{th}$ subframe, the same scrambling sequence may be applied to $n_i^{th}$ to $(n_i+N_c-1)^{th}$ subframes.

The following equation describes $c_{init}$ the above example.

$$C_{init} = N_{abs} * \beta + N_{ID}^{Ncell} \quad \text{[Equation 16]}$$

In Equation 16, $\beta$ may be defined for the purpose of preventing redundant uses of $c_{init}$. $\beta$ may be determined to be $2^9$ or larger to prevent redundant uses of a value determined based on $N_{ID}^{Ncell}$.

In another example, repetitions may occur on a subframe basis, and the scrambling sequence may be an LTE Gold sequence. In this case, the initialization value $c_{init}$ of the LTE Gold sequence may be determined based on at least one of $N_{abs}$, $N_{acc}$, or $N_{ID}^{Ncell}$ (cell ID). $N_{abs}$ represents the total number of DL subframes spanned by the transmission of the physical channel (or signal), including an invalid DL subframe. $N_{acc}$ represents the number of consecutive subframes to which the same scrambling sequence is applied.

The scrambling sequence may be (re-)initialized in every $N_{acc}$ absolute subframes. When the scrambling sequence is (re-)initialized in an $n_i^{th}$ absolute subframe, the same scrambling sequence may be applied to $n_i^{th}$ to $(n_i+N_{acc}-1)^{th}$ absolute subframes.

The following equation describes $c_{init}$ in the above example.

$$c_{init}=\lfloor N_{abs}/N_{acc}\rfloor *\beta+N_{ID}^{Ncell} \qquad \text{[Equation 17]}$$

In Equation 17, $\beta$ may be defined for the purpose of preventing redundant uses of $c_{init}$. $\beta$ may be determined to be $2^9$ or larger to prevent redundant uses of a value determined based on $N_{ID}^{Ncell}$.

In another example, repetitions may occur on a subframe basis, and the scrambling sequence may be an LTE Gold sequence. In this case, the initialization value $c_{init}$ of the LTE Gold sequence may be determined based on at least one of $N_{abs}$, $N_{acc}$, $n_s$, $n_f$ or $N_{ID}^{Ncell}$ (cell ID).

A position at which the scrambling sequence is (re-)initialized may always be fixed in a radio frame.

The following equation describes $c_{init}$ in the above example.

$$C_{init}=\lfloor [N_{abs}+(N_{acc}-\alpha)]/N_{acc}\rfloor *\beta+N_{ID}^{Ncell} \qquad \text{[Equation 18]}$$

In Equation 18, $\alpha$ may be defined to set the position at which the scrambling sequence is (re-)initialized. If $N_{acc}=10$, $\alpha$ may be set to 2 to facilitate subframe-wise coherent combining in a situation in which consecutive DL subframe periods are limited, as in TDD.

In Equation 18, $\beta$ may be defined for the purpose of preventing redundant uses of $c_{init}$. $\beta$ may be determined to be $2^9$ or larger to prevent redundant uses of a value determined based on $N_{ID}^{Ncell}$.

Figure 18:
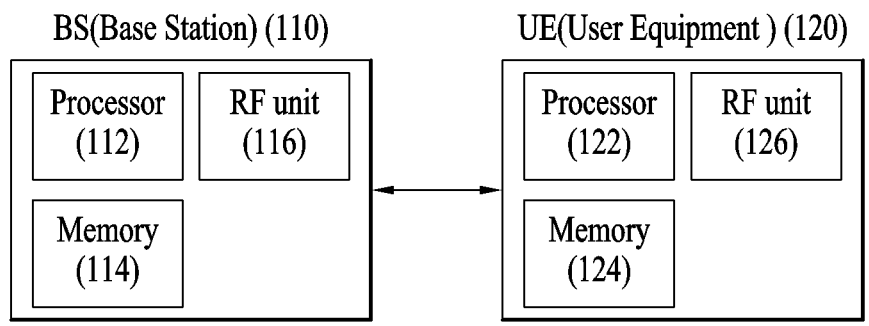
FIG. 18 is a block diagram illustrating a base station (BS) and a user equipment (UE) applicable to an embodiment of the present disclosure.

FIG. 18 illustrates a BS and a UE of a wireless communication system, which are applicable to embodiments of the present disclosure.

Referring to FIG. 18, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method performed by a communication device in a wireless communication system, the method comprising:
    receiving a wake-up signal (WUS) in a subframe on a carrier, wherein the subframe includes a plurality of consecutive orthogonal frequency division multiplexing (OFDM) symbols and a plurality of consecutive subcarriers, and wherein the WUS includes a WUS sequence that is scrambled with a scrambling sequence, wherein an initial value of the scrambling sequence is based on a time unit index for a paging occasion (PO) associated with the WUS; and
    attempting to detect a physical downlink control channel (PDCCH) in the PO associated with the WUS, wherein, based on the carrier being in an in-band mode, the WUS exists in OFDM symbols from an $N^{th}$ (N>1) OFDM symbol of the subframe to a last OFDM symbol of the subframe, and no WUS exists in OFDM symbols from a $1^{st}$ OFDM symbol of the subframe to an $(N-1)^{th}$ OFDM symbol of the subframe, and wherein, based on the carrier being in a guard-band mode or a stand-alone mode, the WUS exists in the OFDM symbols from the $N^{th}$ (N>1) OFDM symbol of the subframe to the last OFDM symbol of the subframe, and a partial WUS exists on (N−1) consecutive OFDM symbols among the OFDM symbols from the $N^{th}$ (N>1) OFDM symbol of the subframe to the last OFDM symbol of the subframe, in addition to existing in the OFDM symbols from the $1^{st}$ OFDM symbol of the subframe to the $(N-1)^{th}$ OFDM symbol the subframe.

2. The method according to claim 1, wherein the subframe in which the WUS is received includes 14 consecutive OFDM symbols and 12 consecutive subcarriers, and N is equal to 4.

3. The method according to claim 2, wherein the WUS sequence includes a length-131 Zadoff-Chu (ZC) sequence.

4. The method according to claim 1, wherein, based on the carrier being in the in-band mode, a frequency band of the carrier is located within a $3^{rd}$ generation partnership project (3GPP) long term evolution (LTE) system band, and wherein, based on the carrier being in the guard-band mode or the stand-alone mode, the frequency band of the carrier is located outside the 3GPP LTE system band.

5. The method according to claim 1, wherein N is equal to 4, and the (N−1) consecutive OFDM symbols in which the partial WUS exists include $4^{th}$, $5^{th}$, and $6^{th}$ OFDM symbols of the subframe.

6. The method according to claim 1, wherein the PDCCH has a paging radio network temporary identifier (P-RNTI).

7. A communication device configured to operate in a wireless communication system, the communication device comprising:
a processor; and
a memory coupled to the processor and storing instructions that, based on being executed by the processor, perform operations comprising:
receiving a wake-up signal (WUS) in a subframe on a carrier, wherein the subframe includes a plurality of consecutive orthogonal frequency division multiplexing (OFDM) symbols and a plurality of consecutive subcarriers, and wherein the WUS includes a WUS sequence that is scrambled with a scrambling sequence, wherein an initial value of the scrambling sequence is based on a time unit index for a paging occasion (PO) associated with the WUS, and
attempting to detect a physical downlink control channel (PDCCH) in the PO associated with the WUS,
wherein, based on the carrier being in an in-band mode, the WUS exists in OFDM symbols from an $N^{th}$ (N>1) OFDM symbol of the subframe to a last OFDM symbol of the subframe, and no WUS exists in OFDM symbols from a $1^{st}$ OFDM symbol of the subframe to an $(N-1)^{th}$ OFDM symbol of the subframe, and wherein, based on the carrier being in a guard-band mode or a stand-alone mode, the WUS exists in the OFDM symbols from the $N^{th}$ (N>1) OFDM symbol of the subframe to the last OFDM symbol of the subframe, and a partial WUS exists on (N−1) consecutive OFDM symbols among the OFDM symbols from the $N^{th}$ (N>1) OFDM symbol of the subframe to the last OFDM symbol of the subframe, in addition to existing in the OFDM symbols from the $1^{st}$ OFDM symbol of the subframe to the $(N-1)^{th}$ OFDM symbol of the subframe.

8. The communication device according to claim 7, wherein the subframe in which the WUS is received includes 14 consecutive OFDM symbols and 12 consecutive subcarriers, and N is equal to 4.

9. The communication device according to claim 8, wherein the WUS sequence includes a length-131 Zadoff-Chu (ZC) sequence.

10. The communication device according to claim 7, wherein based on the carrier being the in-band mode, a frequency band of the carrier is located within a $3^{rd}$ generation partnership project (3GPP) long term evolution (LTE) system band, and wherein based on the carrier being the guard-band mode or the stand-alone mode, the frequency band of the carrier is located outside the 3GPP LTE system band.

11. The communication device according to claim 10, wherein N is equal to 4, and the (N−1) consecutive OFDM symbols in which the partial WUS exists include $4^{th}$, $5^{th}$, and $6^{th}$ OFDM symbols of the subframe.

12. The communication device according to claim 7, wherein the PDCCH has a paging radio network temporary identifier (P-RNTI).

13. The communication device according to claim 7, further comprising a radio frequency (RF) module.

* * * * *